United States Patent
Lundborg et al.

(10) Patent No.: US 11,784,698 B2
(45) Date of Patent: Oct. 10, 2023

(54) METHOD AND ARRANGEMENT FOR BEAM ASSIGNMENT SUPPORT

(71) Applicant: Telefonaktiebolaget LM Ericsson (publ), Stockholm (SE)

(72) Inventors: Tomas Lundborg, Hässelby (SE); Kjell Larsson, Luleå (SE); Andreas Ermedahl, Spånga (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 637 days.

(21) Appl. No.: 16/955,767

(22) PCT Filed: Dec. 21, 2017

(86) PCT No.: PCT/SE2017/051329
§ 371 (c)(1),
(2) Date: Jun. 18, 2020

(87) PCT Pub. No.: WO2019/125255
PCT Pub. Date: Jun. 27, 2019

(65) Prior Publication Data
US 2021/0105057 A1   Apr. 8, 2021

(51) Int. Cl.
*H04B 7/06*   (2006.01)
*H04W 28/08*  (2023.01)
*H04W 28/02*  (2009.01)

(52) U.S. Cl.
CPC ......... *H04B 7/0695* (2013.01); *H04B 7/0617* (2013.01); *H04W 28/0268* (2013.01); *H04W 28/095* (2020.05)

(58) Field of Classification Search
CPC ............ H04B 7/06–065; H04B 7/0617; H04B 7/0695; H04W 28/0268; H04W 28/0925; H04W 28/0942; H04W 28/095
See application file for complete search history.

(56) References Cited

U.S. PATENT DOCUMENTS 8,670,717 B2 * 3/2014 van Rensburg ...... H04B 7/0604
455/63.1
2007/0054701 A1 3/2007 Hovers et al.
(Continued)

OTHER PUBLICATIONS

International Search Report and Written Opinion for International Application No. PCT/SE2017/051329, dated Sep. 4, 2018, 15 pages.

(Continued)

*Primary Examiner* — Benjamin H Elliott, IV
*Assistant Examiner* — Prince A Mensah
(74) *Attorney, Agent, or Firm* — Nicholson De Vos Webster & Elliott LLP

(57) ABSTRACT

A method for beam assignment support comprises obtaining of, in a radio base station, a set of channel gain estimations representing potential transmissions in a set of beams to a user equipment. A set of bias values is obtained, representing connection quality predictions for a respective beam of the set of beams for transmission to the user equipment. The connection quality predictions are estimations calculated from measures of previous traffic load, previous radio quality of transmissions, and/or previous beam assignments of the first transmission reception point. A set of biased channel gain estimations is determined by weighting the channel gain estimations in dependence of respective bias values. A beam assignment based on the biased channel gain estimations is initiated. A method also for determining bias values in a network node as well as radio base stations.

18 Claims, 25 Drawing Sheets

(56) References Cited

U.S. PATENT DOCUMENTS

| | | | |
|---|---|---|---|
| 2009/0154352 A1* | 6/2009 | Sun ........................ | H04W 72/54 |
| | | | 370/235 |
| 2012/0076031 A1* | 3/2012 | Zeira ..................... | H04W 52/42 |
| | | | 370/252 |
| 2014/0286291 A1 | 9/2014 | Einhaus et al. | |
| 2015/0004918 A1* | 1/2015 | Wang .................... | H04W 40/12 |
| | | | 455/73 |
| 2016/0066197 A1* | 3/2016 | Park ..................... | H04B 7/0695 |
| | | | 370/329 |
| 2018/0054744 A1* | 2/2018 | Smith ............... | H04W 72/0446 |
| 2019/0181941 A1* | 6/2019 | Kim ..................... | H04W 72/23 |

OTHER PUBLICATIONS

Communication pursuant to Article 94(3) EPC for EP Application No. 17823248.4, dated Jul. 6, 2021, 7 pages.
International Preliminary Report on Patentability for International Application No. PCT/SE2017/051329, dated Jul. 2, 2020, 13 pages.

\* cited by examiner

METHOD AND ARRANGEMENT FOR BEAM ASSIGNMENT SUPPORT

CROSS-REFERENCE TO RELATED APPLICATIONS

This application is a National stage of International Application No. PCT/SE2017/051329, filed Dec. 21, 2017, which is hereby incorporated by reference.

TECHNICAL FIELD

The proposed technology generally relates to beam management in a communication system utilizing beamforming antennas, and in particular to methods and arrangements for beam assignment support.

BACKGROUND

In the 5th Generation (5G) wireless systems in standardization, beamforming will be a central technology. In order to meet increasing capacity requirements migration into spectrum at higher carrier frequencies will be required. In a first step, frequencies at 3.5-5 GHz are intended, continuing to the soon available 28 GHz and 39 GHz bands and beyond, towards 60-100 GHz. For these higher bands, beamforming with massive antenna arrays, in the end with hundreds of elements, will be needed to compensate for the more challenging radio propagation conditions properties at higher frequencies.

In a system utilizing beamforming antennas, finding the best beam to allocate requires some measurements. Beam allocation decisions are typically made on link level. Coordination of beam allocation between separate Transmission Reception Points (TRPs) is more complex. This especially prominent if the TRPs are not connected to the same base band unit. This is a problem area for 5G that is today not fully explored.

There exist several different technical approaches to handle the actual beamforming. The least complex method to form beams is to use a fixed set of beams, a grid of beam implementation. This allows the system to use analog beamforming. In other methods, fully digital beamforming exists, which allows the system to more or less create beams with any shapes, but this becomes very complex and put extreme requirements on the hardware and the interfaces to be able to steer each antenna element in a large array. In the between, hybrid solutions which do some of the beam forming in the digital domain and other in the analog domain.

User Equipment (UE) measurements are typically used to determine a best beam to allocate. The respective measured signal quality per beam is reported to the access network. Measurements may be collected by e.g. the Radio Control Function (RCF) as proposed for New Radio (NR), where coordination actions towards radio nodes may be issued.

Beam selection is local at the Radio Base Station (RBS), due to latency for the signaling towards other nodes. The RBS may consist of a set of TRPs connected to a baseband unit. The beam management between those TRPs is rather straight forward if a Channel Quality Indicator (CQI) is used since the system can be configured to measure in such a way that interfering beams are monitored. However, if the TRPs are part of other base stations the coordination becomes much harder due to inter node latency. If beam selection is based on signal strength measurements, coordination will be problematic even if the TRPs are connected to the same base station. There is no specified way of conveying knowledge on beam combinations, e.g. involving beams of several base stations, that should be preferred or avoided to the fast beam selection processes in the connected base stations, due to latency within the system.

A similar problem exists within a single RBS when the inherent latency of radio quality measurement reporting may cause beam allocations to lag behind the actual UE location, if the UE is moving fast.

In a massive MIMO system, finding the ideal serving beam is a system-wide decision. From a practical perspective, at the local TRP connection, it is possible to take fast, in the order of a millisecond, beam selection decisions to cater for fast fluctuations in the radio link. However, on a system-wide level, inter node latency and inherent reporting latency will only allow control on a slower time scale. Thus it is impossible to directly influence next time slot beam selection based on an observation made outside the "own" node.

SUMMARY

It is an object to provide beam assignment support that let slower control decisions influence the fast beam selection in a TRP beam assignment in a balanced way.

This and other objects are met by embodiments of the proposed technology.

According to a first aspect, there is provided a method for beam assignment support, wherein the method comprises obtaining of, in a radio base station, a set of channel gain estimations representing potential transmissions in a set of beams to a user equipment. The set of beams are used by a first TRP. In the radio base station, a set of bias values is obtained, representing connection quality predictions for a respective beam of the set of beams for transmission to the user equipment. The connection quality predictions are estimations calculated at least from measures of at least one of previous traffic load, previous radio quality of transmissions, and previous beam assignments of the first TRP. In the radio base station, a set of biased channel gain estimations is determined by weighting the channel gain estimations in dependence of respective bias values. In the radio base station, a beam assignment based on the biased channel gain estimations is initiated.

According to a second aspect, there is provided a method for beam assignment support, wherein the method comprises obtaining of measures of at least one of previous traffic load, previous radio quality of transmissions, and previous beam assignments of a first TRP. A set of bias values are calculated using the obtained measures. The set of bias values represents connection quality predictions for a set of beams for transmission to a user equipment. The set of beams is used by the first TRP. Transmission of the set of bias values to a radio base station managing the set of beams is initiated.

According to a third aspect, there is provided a radio base station in a cellular communication system. The radio base station is configured to obtain a set of channel gain estimations representing potential transmissions in a set of beams to a user equipment. The set of beams are used by a first TRP. The radio base station is further configured to obtain a set of bias values representing connection quality predictions for a respective beam of the set of beams for transmission to the user equipment. The connection quality predictions are estimations calculated at least from measures of at least one of previous traffic load, previous radio quality of transmissions, and previous beam assignments of the first TRP. The radio base station is further configured to determine a set of biased channel gain estimations by weighting the channel gain estimations in dependence of respective bias values. The radio base station is further configured to initiate a beam assignment based on the biased channel gain estimations.

According to a fourth aspect, there is provided a node connected to a cellular communication network. The node is configured to obtain measures of at least one of previous traffic load, previous radio quality of transmissions, and previous beam assignments of a first TRP. The node is further configured to calculate a set of bias values representing connection quality predictions for a set of beams for transmission to a user equipment, using the obtained measures. The set of beams is used by the first TRP. The node is further configured to initiate transmission of the set of bias values to a radio base station managing the set of beams.

According to a fifth aspect, there is provided a computer program comprising instructions, which when executed by at least one processor, cause the processor(s) to obtain a set of channel gain estimations. The set of channel gain estimations represents potential transmissions in a set of beams to a user equipment. The set of beams is used by a first TRP. The computer program comprising further instructions, which when executed by the processor(s), cause the processor(s) to obtain a set of bias values. The bias values represent connection quality predictions for a respective beam of the set of beams for transmission to the user equipment. The connection quality predictions are estimations calculated at least from measures of at least one of previous traffic load, previous radio quality of transmissions, and previous beam assignments of the first TRP. The computer program comprising further instructions, which when executed by the processor(s), cause the processor(s) to determine a set of biased channel gain estimations by weighting the channel gain estimations in dependence of respective bias values. The computer program comprising further instructions, which when executed by the processor(s), cause the processor(s) to initiate a beam assignment based on the biased channel gain estimations.

According to a sixth aspect, there is provided a computer program comprising instructions, which when executed by at least one processor, cause the processor(s) to obtain measures of at least one of previous traffic load, previous radio quality of transmissions, and previous beam assignments of a first TRP. The computer program comprising further instructions, which when executed by the processor(s), cause the processor(s) to calculate a set of bias values representing connection quality predictions for a set of beams for transmission to a user equipment, using the obtained measures. The set of beams is used by the first TRP. The computer program comprising further instructions, which when executed by the processor(s), cause the processor(s) to initiate transmission of the set of bias values to a radio base station managing the set of beams.

According to a seventh aspect, there is provided a computer-program product comprising a computer-readable medium having stored thereon a computer program of at least one of the fifth and sixth aspect.

According to an eighth aspect, there is provided a carrier comprising the computer program of at least one of the fifth and sixth aspect. The carrier is one of an electronic signal, an optical signal, an electromagnetic signal, a magnetic signal, an electric signal, a radio signal, a microwave signal, or a computer-readable storage medium.

According to a ninth aspect, there is provided a radio base station in a cellular communication system. The radio base station comprises a channel gain estimator, for obtaining a set of channel gain estimations representing potential transmissions in a set of beams to a user equipment. The set of beams are used by a first TRP. The radio base station further comprises a bias value predictor, for obtaining a set of bias values representing connection quality predictions for a respective beam of the set of beams for transmission to the user equipment. The connection quality predictions are estimations calculated at least from measures of at least one of previous traffic load, previous radio quality of transmissions, and previous beam assignments of said first TRP. The radio base station further comprises a biased channel gain determinator, for determining a set of biased channel gain estimations by weighting the channel gain estimations in dependence of respective bias values. The radio base station further comprises a beam assignment initiator, for initiating a beam assignment based on the biased channel gain estimations.

According to a tenth aspect, there is provided a node connected to a cellular communication network. The node comprises a measure obtaining module, for obtaining measures of at least one of previous traffic load, previous radio quality of transmissions, and previous beam assignments of a first TRP. The node further comprises a calculator, for calculating a set of bias values representing connection quality predictions for a set of beams for transmission to a user equipment, using the obtained measures. The set of beams is used by the first TRP. The node further comprises a transmission initiator, for initiating transmission of the set of bias values to a radio base station managing the set of beams.

An advantage of the proposed technology is there is provided means for controlling beam allocation based on processes that are slower than the fast radio environment changes that are only observable within the node. Such processes are e.g. activity of own or other UE:s and mobility, and also static or semi-static phenomena like buildings, parked vehicles, foliage etc.

Other advantages will be appreciated when reading the detailed description.

BRIEF DESCRIPTION OF THE DRAWINGS

The embodiments, together with further objects and advantages thereof, may best be understood by making reference to the following description taken together with the accompanying drawings, in which.

DETAILED DESCRIPTION

Throughout the drawings, the same reference designations are used for similar or corresponding elements.

For a better understanding of the proposed technology, it may be useful to begin with a brief overview of a general communication system utilizing beam forming.

Figure 1:
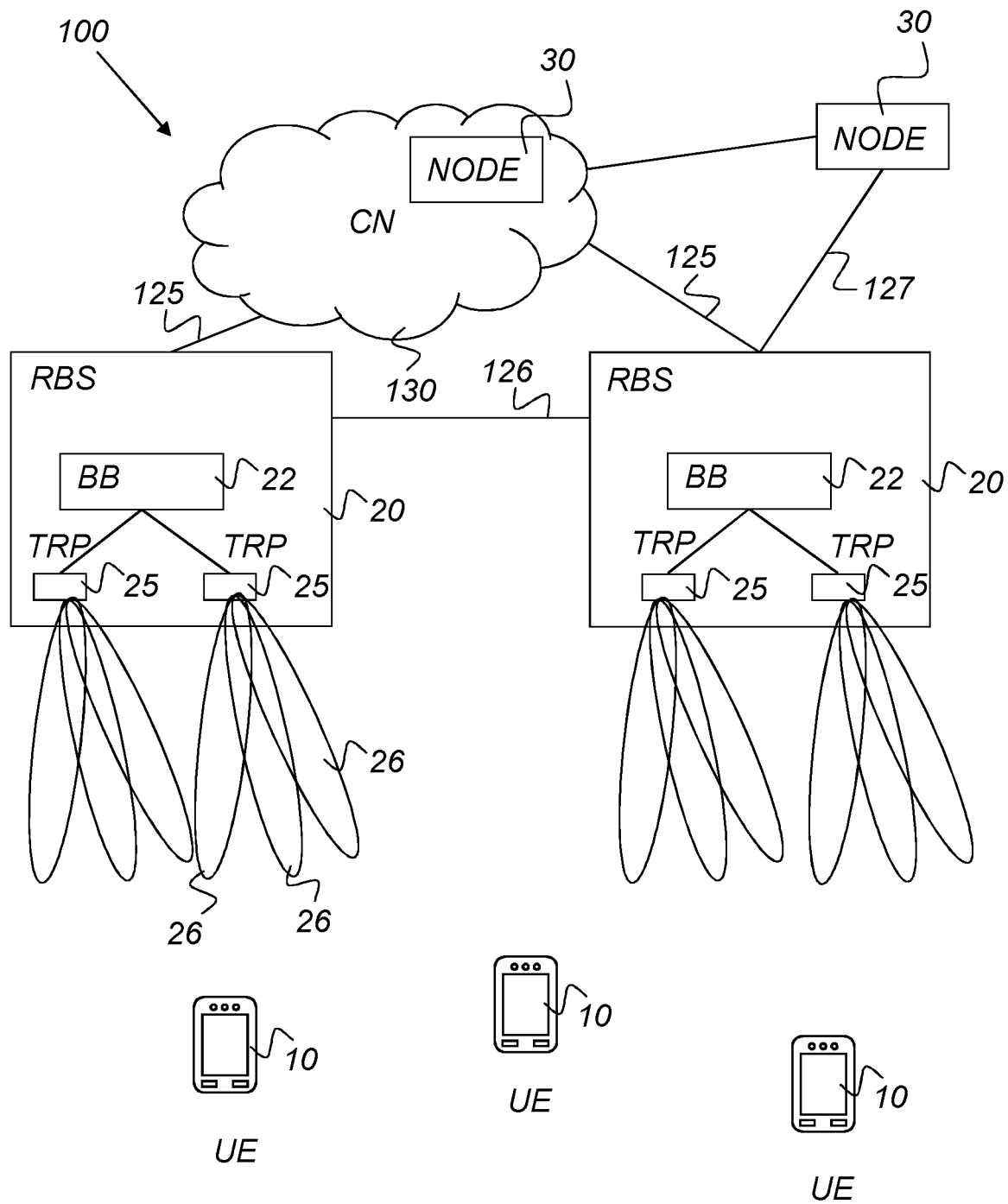
FIG. 1 is a schematic illustration of an embodiment of a communication system utilizing beamforming.

FIG. 1 is a schematic illustration of an embodiment of a communication system 100 utilizing beamforming. A Radio Base Station (RBS) 20 comprises a baseband unit 22 and a number of Transmission reception points (TRP) 25. The antennas of the TRPs 25 are configured to transmit radio signals in a number of beams 26. User Equipment (UE) 10 may use one or several of these beams 26 for communication with the RBSs 20. The RBSs 20 are connected to a Core Network (CN) 130 by means of a connection 125. The RBSs 20 may also have different possibilities of direct contact, illustrated by the connection 126. The CN 130 may comprise different network nodes 30 configured to assist in different parts of the management of the communication system 100. The network nodes 30 may also be situated outside the actual CN 30, e.g. in different types of cloud arrangements. The network nodes 30 may be connected to the RBSs 20 via the CN 130, and/or directly to the RBSs 20, as illustrated by the connection 127.

Figure 2:
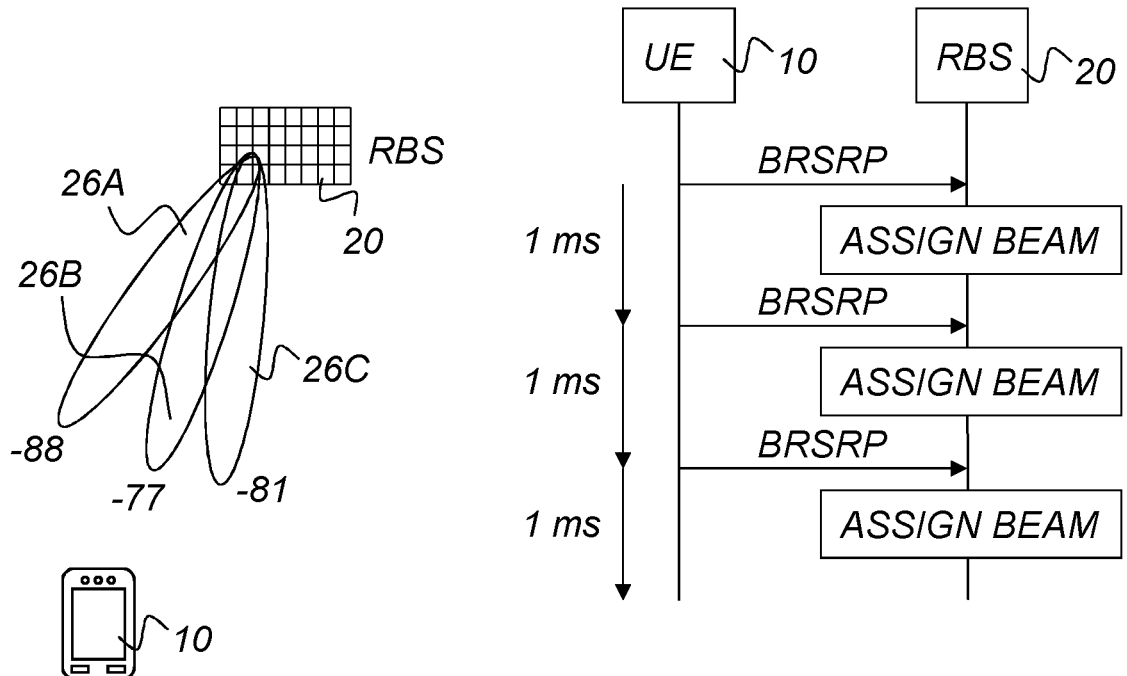
FIG. 2 is a schematic illustration of an embodiment of beam assignment based on Beam Reference Symbol Reference Power.

FIG. 2 is a schematic illustration of an embodiment of beam assignment based on Beam Reference Symbol Reference Power (BRSRP). An RBS 20 provides in this example three beams 26A-C. A UE 10 measures the reference power of the beam reference symbol for each of the beams 26A-C. In this particular example, the UE 10 measures a channel gain of −88 dB of beam 26A, −77 dB of beam 26B and −81 dB of beam 26C. As illustrated in the signaling chart in the right part of FIG. 2, the BRSRP measurements are reported from the UE 10 to the RBS 20. The RBS 20 assigns a beam for a next transmission based on the received BRSRP values. In this particular example, beam 26B is selected due to the highest channel gain. The procedure will then repeat, typically with a repetition time of the order of magnitude of 1-10 ms, allowing a beam assignment on recently performed power measurements.

In a more mathematical formulation, assuming that an estimated channel gain for a UE i, on a beam j is:

$$h_{ij} = \frac{BRSRP_{ij} - n_j}{P_{ij}},$$

with $BRSRP_{ij}$ being the measured received beam power, $P_j$ the transmitted beam power, and $n_j$ the noise estimate per beam.

The estimated channel gain H to be considered for beam allocation at a TRP then becomes:

$$H = \begin{bmatrix} h_{11} & \cdots & h_{1J} \\ \vdots & h_{ij} & \vdots \\ h_{I1} & \cdots & h_{IJ} \end{bmatrix}$$

Beam selection can then typically be performed by finding highest channel gain:

choose beam j:

$$h_i = \max_{ij} H.$$

However, the optimum beam assignment may not only be dependent on the channel gains in the beams of the own TRP. There might be beam channel impairments that are not fully reflected in the channel gain estimations. The communication situation may e.g. be influenced by beams from other base stations or by other external conditions. It is in many cases possible for different nodes within the communication system to estimate such beam channel impairments, but the coordination becomes much harder due to inter node latency. There is no specified way of conveying knowledge on beam combinations, e.g. involving beams of several base stations, which beam combinations should be preferred or avoided to the fast beam selection processes in the connected base stations, due to latency within the system.

Figure 3:
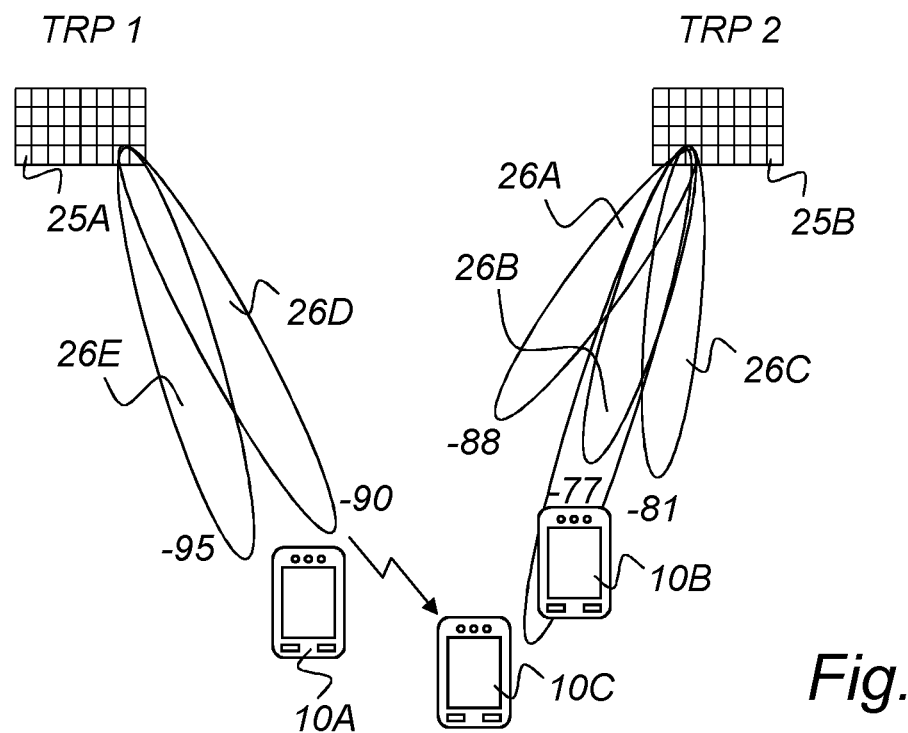
FIG. 3 is a schematic illustration of conflicts at beam allocation.

In FIG. 3, some conflict situations at beam allocation are schematic illustrated. The TRP 2 25B handles communication with two UEs 10B and 10C. The UE 10B can select between three beams 26A-C, while UE 10C only can utilize one beam 26B. However, beam 26B is also the best choice for the UE 10B, when only the channel gain is considered. A best total solution would probably be to assign beam 26C, having only a marginally worse channel gain, to UE 10B and assign the beam 26B to the UE 10C.

The UE 10A, presently communicating with TRP 1 25A, has beam 26D as a best choice of beam, while beam 26E only is a little bit worse. However, signalling in beam 26D may influence the interference of beam 26B of TRP 2 25B, and thereby make the situation for UE 10C worse than expected from the power measurements. A best total solution would probably be to assign beam 26E to UE 10A.

Figure 4:
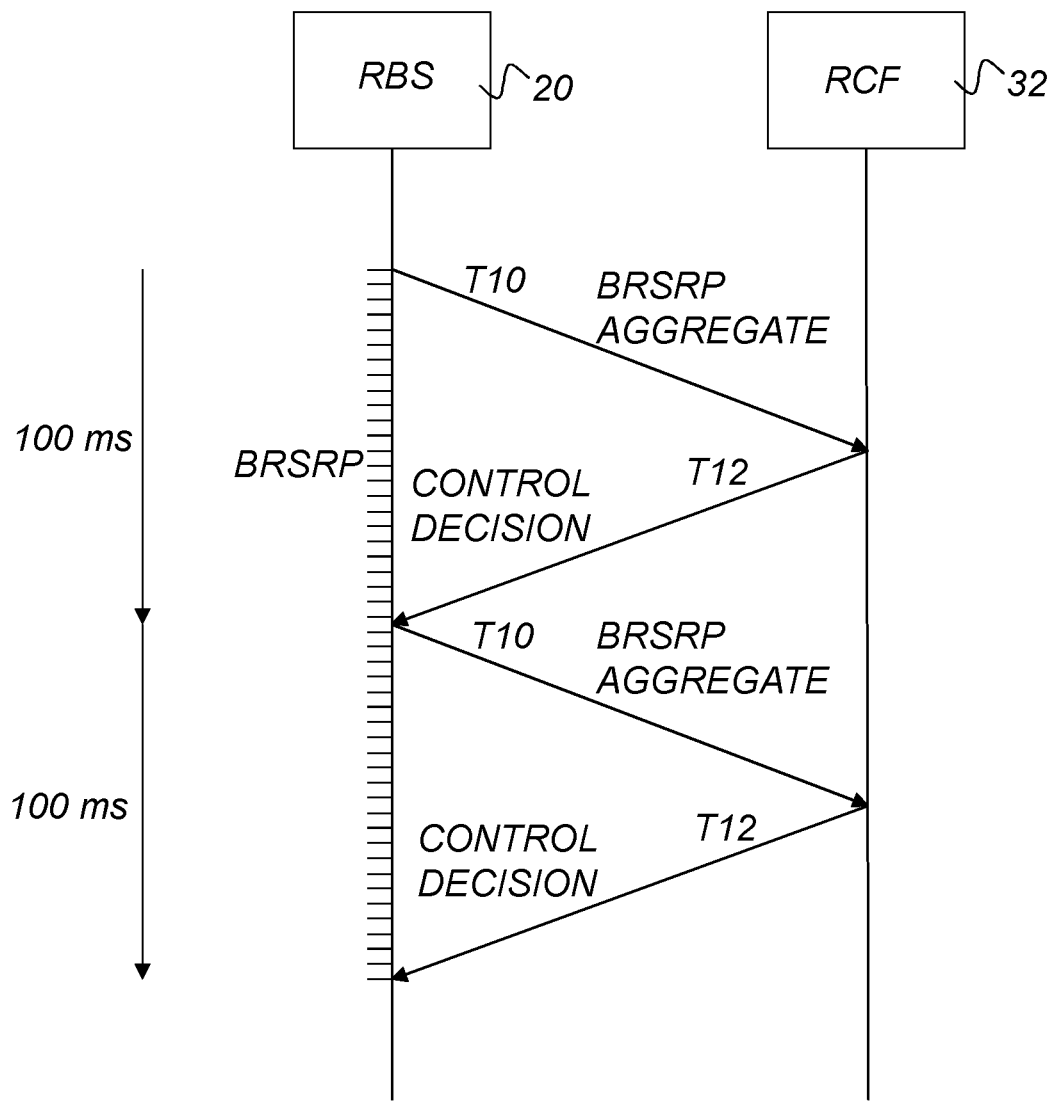
FIG. 4 is a schematic illustration of latency problem for higher layer control functions.

As can be concluded from the above examples, there would be a benefit if also other parameters than local beam power is used for deciding on a beam assignment. However, latency within higher layer control functions are then problematic. In FIG. 4, examples of latency problems for higher layer control functions are illustrated schematically. Different RBSs 20 collect BRSRP values and sends T10 them as a BRSRP aggregate to a Radio Control Function (RCF) 32 e.g. located in the core network, or elsewhere in the access network. The RCF 32 evaluates the received BRSRP aggregate and may decide on a control decision, which is transmitted back to the RBSs 20 at T12. Due to latency in the internal communication, the time between the measurement occasion and the reception of the control decision may be as high as in the order of 100 ms, i.e. far longer times than are utilized for normal beam assignments based directly on local BRSRP measurements. The basis on which the control decision is taken may therefore be far too old to be able to provide any improved beam assignment.

Figure 5:
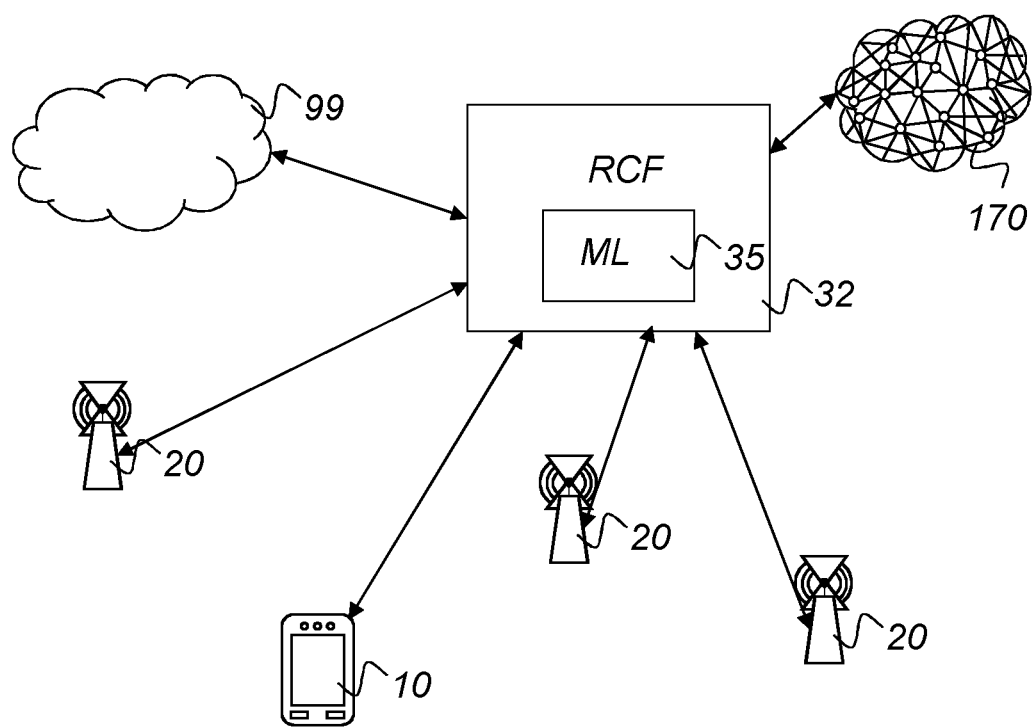
FIG. 5 illustrates the principles of high level Machine Learning.

However, the information that such a central control function can obtain is, as such, of great interest. As illustrated in FIG. 5, an RCF 32 may collect information from a UE 10, from RBSs 20, from a network administrator 170 and from external sources 99. Based on this information, the RCF 32 may obtain a deep understanding of the communication system as such as well as of the present situation. It might e.g. be possible to find beam directions that always show poor average service performance, beam directions that suffer from faults known in the system, less useful beam directions due to radio environment, the existence of untraceable interference sources, e.g. noisy electrical equipment, beam directions that often disturb traffic in other cells or are disturbed by traffic in certain beams in neighboring cells. Other external conditions, such as temperature or weather may also be taken into account.

These factors that may be considered may be static, semi static or fluctuating. By following the history of beam selections for moving traffic, speed and direction of the UE can be estimated and predictions of a future path may be found. Historical dependencies of certain conditions, e.g. load as a function of the time of the day, may be tracked.

The possibilities for achieving information is almost endless and the task to process all this data into useful information is complex. For this potentially very complex task, Machine Learning (ML) 35 solutions may be very well suited. By using ML techniques, a massive amount of higher layer information input may be used, even weather information or vehicle traffic statistics.

As mentioned above, such high-layer aggregated information can be very useful in finding appropriate beam assignment, at least if the time aspect is neglected. One possible solution to this timing problem is to, instead of replacing the normal power-measurement-based assignment with assignment based only on high-layer information, using the high-layer information as a biasing or weighting of the power measurements. In such a way, the fast changing radio conditions are still tracked by the fast power measurement procedure, while the high-layer information is entered as a bias. Changes in this bias can be provided with a much slower pace than the fast power measurement.

To this end, a set of "bias" values, one subset for each possible beam direction and UE, and for a time span of near future time slots, is implemented in the base station. Each of these subsets of bias values is configurable by algorithms independent of the local RBS beamforming procedure, which determines the beam direction from the local UE-RBS signal quality measurements. By including the respective bias values in the evaluation of a certain beam direction, it is then possible to weigh in other factors that the local link quality into the beam direction selection.

As indicated above, these other factors may be static, semi static or fluctuating. It will thus be possible to suppress beam directions that always show poor average service performance. There might be many reasons, for instance that there exists disturbing Cell Reference Symbols (CRS) in neighboring cells. Another reason may be that poor service performance, in terms of bitrate and or latency, exists in an own cell even though BRSRP is good. The suppressing may also avoid beam directions that suffer from faults known in the system, e.g. faulty receive antenna path. It will also be possible to punish beam directions that has lesser probability of achieving high ranks than other beams, due to radio environment, when beam selection is based only on signal strength. The suppressing may also avoid in practice untraceable interference sources, e.g. noisy electrical equipment.

It will also be possible to avoid beam directions that disturb traffic in other cells, but then preferably only if traffic exists or is predicted to exist in the relevant beam directions in those cells. Conversely, if traffic in other cells is to be allocated when these beam directions are used, restrictions can be applied.

The use of bias value may also lead to better beam selection for fast moving traffic by increasing the probability of selecting a beam further along the predicted path rather than the one with currently best signal quality, which might not be relevant due to measurement reporting and processing latency.

Bias values may be based on predictions that are calculated using measurements from either or both the radio node, UE and external sources.

The calculation of bias values may be performed in the RBS or in an external processing server, depending on latency requirements, HW cost and interface limitations. This will, for example, depend on if full 3GPP compliance is required or proprietary signaling is allowed.

The set of biases is preferably individual per TRP, and preferably also per UE.

The proposed invention enables statistics based coordination of beam assignment for multiple users, when individual UE resource usage is predicted. If FIG. 3 is reconsidered. Here UE 10C and UE 10B may both be served by the same beam. However, since UE 10B have sufficient alternatives, adding a beam selection bias for UE 10B to increase the possibility to assign beam 26C can be used to optimize the overall service quality. Similarly, if a UE 10A is served by another TRP or RBS, its best serving beam direction 26D may be weighed down in favor of a beam direction 26E that causes less interference to UE 10C. As an implementation example, a recorded history of measurements may be considered to be used for predicting estimates of system level performance impact of possible beam allocations.

Figure 6:
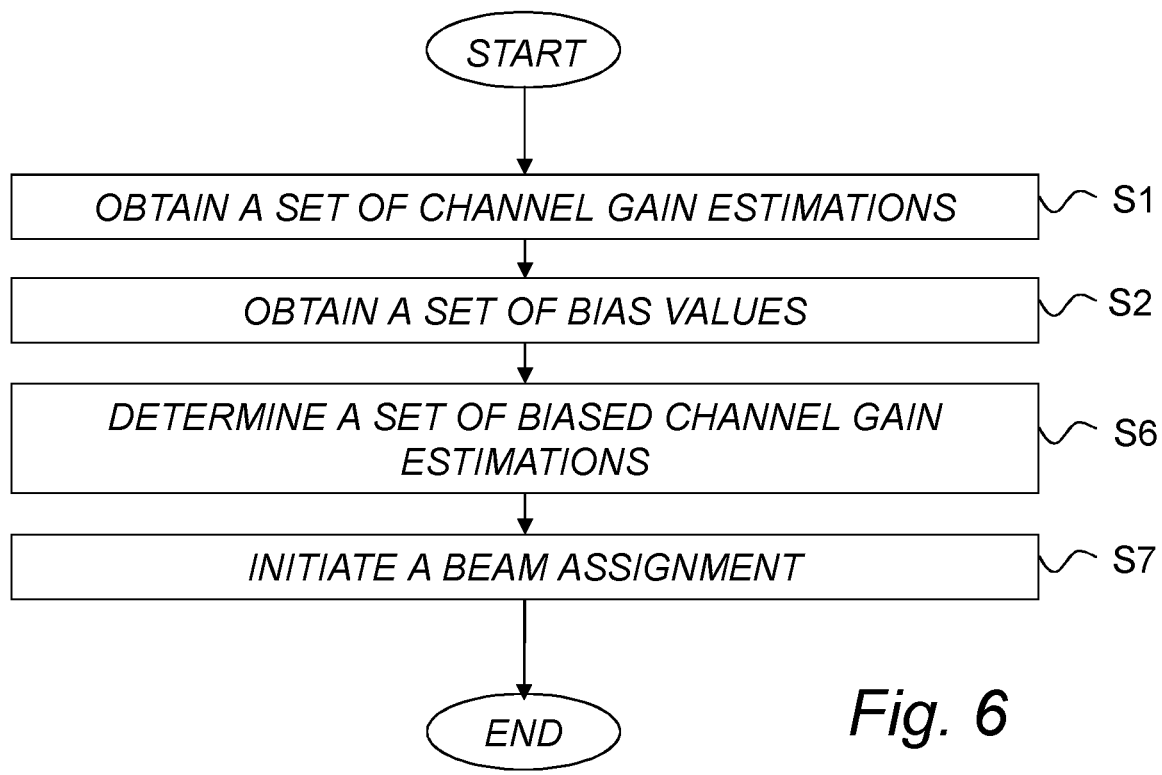
FIG. 6 is a schematic flow diagram illustrating steps of an embodiment of a method for beam assignment support.

FIG. 6 is a schematic flow diagram illustrating steps of an embodiment of a method for beam assignment support. The method comprises in step S1 obtaining of, in a radio base station, a set of channel gain estimations. The set of channel gain estimations represents potential transmissions in a set of beams to a user equipment. The set of beams are used by a first TRP.

In a preferred embodiment, the step S1 of obtaining a set of channel gain estimations comprises receiving measurements associated with channel gain of signalling using the beams of said potential transmissions. These measurements are received from the user equipment, and may preferably be measurements requested by the radio base station. The channel gain estimations are then calculated from these measurements. In a further preferred embodiment, the channel gain estimations are based on measurements of reference signal strengths. The channel gain estimations are typically obtained for all beams of the TRP on which a future transmission may be performed, i.e. representing all potential transmissions for the UE.

With further reference to FIG. 6, in step S2, a set of bias values is obtained in the radio base station. The bias values represent connection quality predictions for a respective beam of the set of beams for transmission to the user equipment. The connection quality predictions are estimations calculated at least from measures of previous traffic load, and/or measures of previous radio quality of transmissions, and/or measures of previous beam assignments of the first TRP.

With further reference to FIG. 6, in step S6, a set of biased channel gain estimations is determined in the radio base station by weighting the channel gain estimations in dependence of respective bias values. In step S7, a beam assignment is initiating in the radio base station, based on the biased channel gain estimations.

If the base station is configured for performing the actual beam assignment procedures, the step S7 comprises the actual performing of a beam assignment.

Today's 5G systems are normally operated with UL and DL on the same frequency. One of the reasons for this is that the channel can be considered to be reciprocal, meaning that the channel for the UL and DL is identical. If this was not the case beam selection should have been needed to be performed for both DL and UL and it should make it much harder to benefit from more advanced beam forming such as fully digital beamforming. With a grid-of-beam solution which is the solution assumed here for simplicity it makes the beam selection easy for the UL since the same beam is used as was selected for the DL. This is normally a good solution and today's analogue beam forming system has not really the signalling needed to efficiently test different grid-of-beam options for the DL. If the needed signalling should be added for the uplink it should be possible to consider the described method independent for DL and UL. However, even if no method for selecting UL beam is considered, i.e. beam is selected based on DL measurements the described method herein can be considered such as different bias matrices is considered for the UL and DL. The reason for this is that e.g. some interference can affect the different nodes different. An example can be some unwanted interference that should not be in the system. It affects one node but is blocked form the other node.

Figure 7:
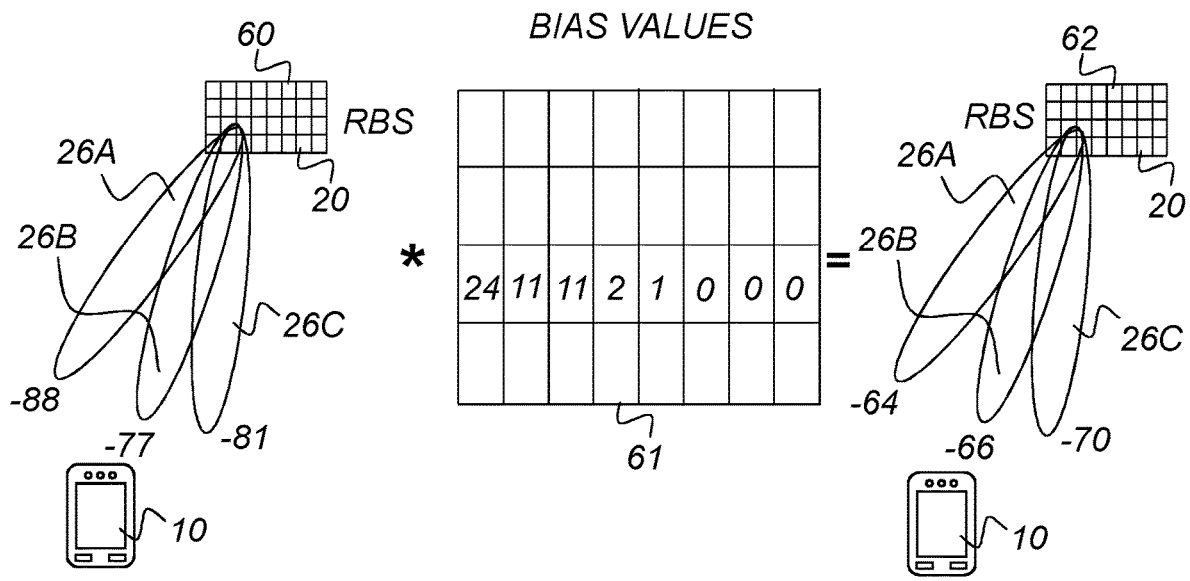
FIG. 7 is a schematic illustration of an application of a bias matrix on a beam assignment matrix.

In a preferred embodiment, the bias values constitute corrections for expected beam channel impairments not being reflected in the channel gain estimations. FIG. 7 illustrates an application of bias values on a beam application decision. A UE 10 is in communicational contact with a RBS 20. Three beams 26A-C are the main choices for the communication. The UE 10 provides the RBS 20 with measurements of e.g. reference signal strengths of the three potential beams. The RBS 20 computes channel gain estimations 60 based on these measurements. The channel gain estimation reveals that the beam 26B is the best choice, when only the channel gain estimations are reflected, showing a gain of −77 dB. However, other available information, not being reflected in the channel gain estimations, shows that beams 26B and 26C are likely to show a poor average service performance at the prevailing conditions. A set of bias values 61 are obtained, giving the beams 26B and 26C lower bias than beam 26A. The channel gain estimations 60 are weighted with the bias values, giving a set of biased channel gain estimations 62. Here, the beam 26A is given the total channel gain of −64 dB, while beam 26B achieves a value of −66 dB. At the next beam assignment, beam 26A is therefore selected.

Note that at a next beam assignment, the original channel gain estimations 60 may be changed. One particular scenery may be that the relative strength of beam 26B relative to beam 26A is increased so much that the bias values cannot compensate for the difference. Beam 26B may then be selected as a next beam assignment. The beam assignment is therefore always dependent on the latest available channel gain estimations 60. The bias values 61 will influence the assignment, but will in most cases only decrease the probability for assigning certain beams, not removing it completely. In this way, the possibly fast varying channel gain estimations 60 are still of crucial importance for the beam assignment. At the same time, bias values 61 achieved from information on a much longer time scale may still improve the beam assignment.

The bias values should thus be estimated such that they reflect the advantage or disadvantage with certain beams in a reasonable way. A far better channel gain may be worth using even if there are other information about e.g. a predicted poor average service performance.

An application in a beam selection algorithm can be as follows:

Assuming the estimated channel gain for UE i, on beam j is $h_{ij}$ as defined further above. The estimated channel gain at a TRP is then H, as defined further above.

With use of bias values weighting the estimated channel gain, a modified beam assignment procedure can be obtained. A "bias matrix" can be defined:

$$B = \begin{bmatrix} b_{11} & \cdots & b_{1J} \\ \vdots & b_{ij} & \vdots \\ b_{I1} & \cdots & b_{IJ} \end{bmatrix}.$$

A biased channel gain estimation can then be obtained by an element-wise multiplication, and a modified beam assignment can be performed as:

choose beam j:

$$h_i = \max_{ij} H \odot B.$$

These matrices H and B are valid per time slot. For control, e.g. preallocation and Machine Learning (ML) purposes, as will be discussed further below, it is likely that they will be created along a time line covering at least the near future and is continuously updated, as well as stored for at least the recent past. Thus H and B are to be seen as generally 3-dimensional, with time slot index as the 3:rd dimension.

In the example above, the bias values are illustrated as single scalar values, in order to simplify the illustration. Such single bias values can in one embodiment be used for weighting the channel gain estimations with one respective value.

In other embodiments, the set of bias values comprises subsets of bias values; typically one subset for each beam and UE. Such subset of values or parameters may comprise values used for beam selection based on more than one value, e.g. signal strength and interference level. The subset of bias values may in further embodiments comprise predicted values for a near future as well, enabling a successive modification of the beam selection algorithm. Such future predictions may also be connected e.g. to current state information. In a such a way a certain type of bias may be applied dependent of whether or not a measurement value exceeds a threshold or not.

In a somewhat more generalized view, the set of bias values can express a number of figures describing parameters and states, which may be used in a beam selection algorithm. These parameters and states can be obtained by different kinds of machine learning procedures.

Figure 8:
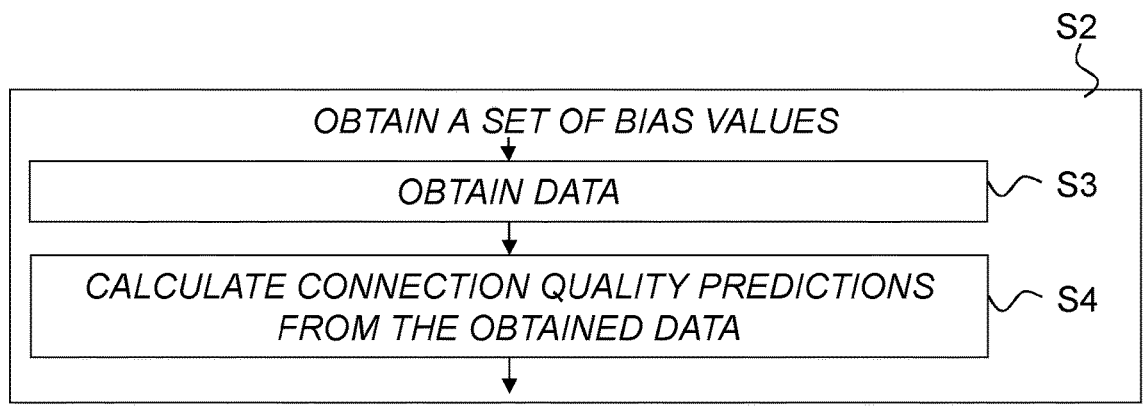
FIG. 8 is a schematic flow diagram illustrating an embodiment of step S2 of FIG. 6.

The actual calculation of the bias values or subsets of bias values may be performed in the radio base station. FIG. 8 is a flow diagram of an embodiment of step S2 of FIG. 6. The step S2 of obtaining a set of bias values comprises the part step S3, in which data is obtained. The data is of such a kind that they can be used for estimation of connection quality predictions. In part step S4, the connection quality predictions are calculated from at least the obtained data. This embodiment has the advantage that once the bias values are calculated they are immediately available in the RBS to be used for a next beam assignment.

Figure 9:
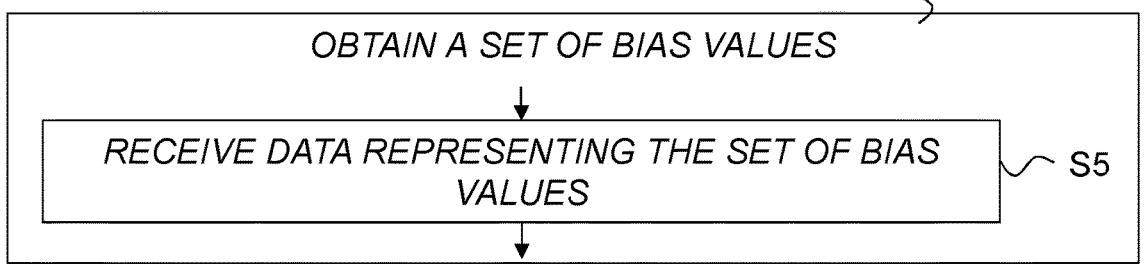
FIG. 9 is a schematic flow diagram illustrating another embodiment of step S2 of FIG. 6.

However, since the information that is used for achieving the bias values are associated with times that are much longer than the times between successive beam allocations, the sensitivity for latencies in communicating such bias values is low. The calculation of the bias values may therefore also be performed elsewhere in the communication system, and the bias values may be transmitted to the RBS. FIG. 9 is a flow diagram of another embodiment of step S2 of FIG. 6. The step S2 of obtaining a set of bias values comprises the part step S5, in which data representing the set of bias values is received. Preferably, the data representing the set of bias values is received from a node configured to provide data representing sets of bias values to a plurality of base stations. Such a node can then provide bias values that also takes interaction between different radio base stations into account.

In a preferred embodiment, the connection quality predictions are estimations calculated also from measures of previous traffic load, and/or measures of previous radio quality of transmissions, and/or measures of previous beam assignments of a second TRP. The second TRP is in a radio interference relation to the first TRP.

Figure 10:
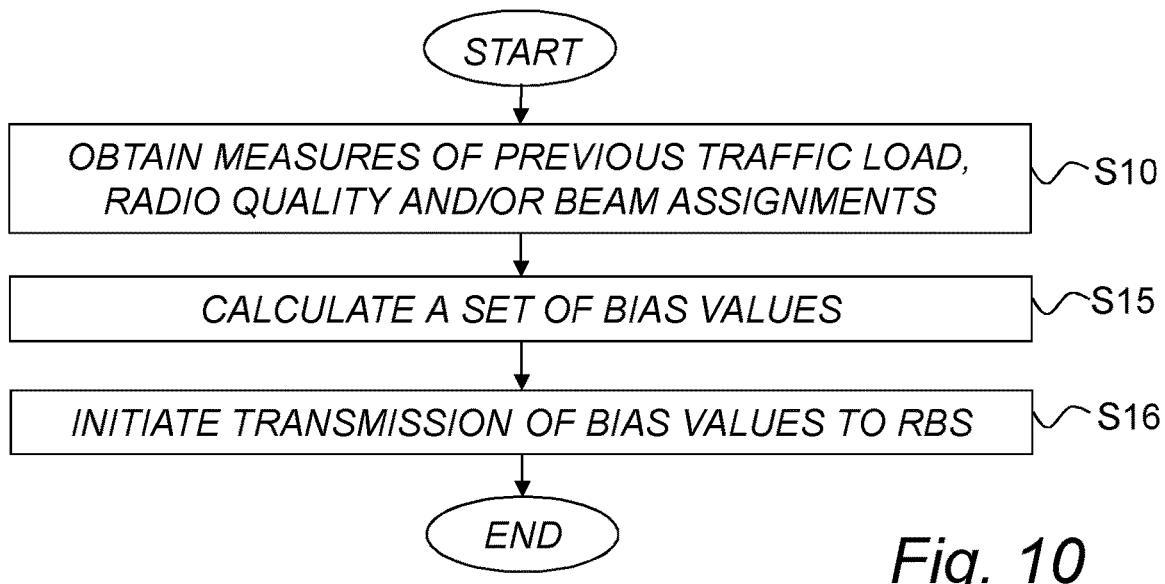
FIG. 10 is a schematic flow diagram illustrating steps of an embodiment of a method for beam assignment support applicable in a central network node.

FIG. 10 is a schematic flow diagram illustrating steps of an embodiment of a method for beam assignment support. The method comprises the step S10, in which measures of at least one of previous traffic load, previous radio quality of transmissions, and previous beam assignments of a first TRP is obtained. In step S15 a set of bias values is calculated using the obtained measures. The bias values represent connection quality predictions for a set of beams for transmission to a user equipment. The set of beams are used by the first TRP. In step S16, transmission of the set of bias values to a radio base station managing the set of beams is initiated.

In an embodiment, where the network node, at which the calculation of bias values is performed, is configured for transmitting data, the step S16 of initiating transmission further comprises the actual transmission of the set of bias values to the radio base station.

As mentioned above, in a preferred embodiment, the bias values constitute corrections for expected beam channel impairments that are not being reflected in the channel gain estimations.

In analogy with the above, in a preferred embodiment, the step S10 of obtaining measures further comprises obtaining measures of at least one of previous traffic load, previous radio quality of transmissions, and previous beam assignments of a second TRP. The second TRP is in a radio interference relation to the first TRP. The step S11 of calculating a set of bias values is then further performed using the measures of at least one of previous traffic load, previous radio quality of transmissions, and previous beam assignments of said first TRP or said second TRP.

In a preferred embodiment, the calculation of bias values can be performed collectively in a central node for a number of radio base stations. In other words, the steps of obtaining measures S10, calculating a set of bias values S15, and initiating transmission S16 of the set of bias values are preferably performed for a plurality of base stations. Much of the obtained measurements can be utilized for bias values for more than one radio base station, and a common procedure can be made very efficient and the increased base for the decisions about bias values may be increased.

Likewise, a common handling of a plurality of UEs may also be advantageous. To that end, the step S2 of obtaining a set of channel gain estimations is preferably performed for a plurality of user equipments. Thereby, the connection quality predictions for the different UEs may be estimated in dependence of each other.

If the bias values are calculated in a network node different from the radio base station, the step S10 of obtaining measures is preferably performed for a plurality of user equipments. Thereby, the step S15 of calculating an individual set of bias values is performed for each individual in the plurality of user equipments.

Figure 11:
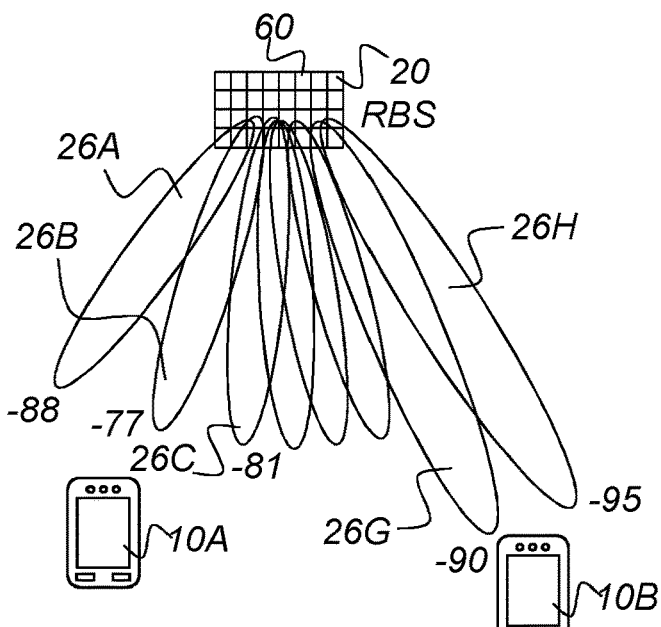
FIG. 11 illustrates an application of individual bias values on a beam application decision.
Figure 11:
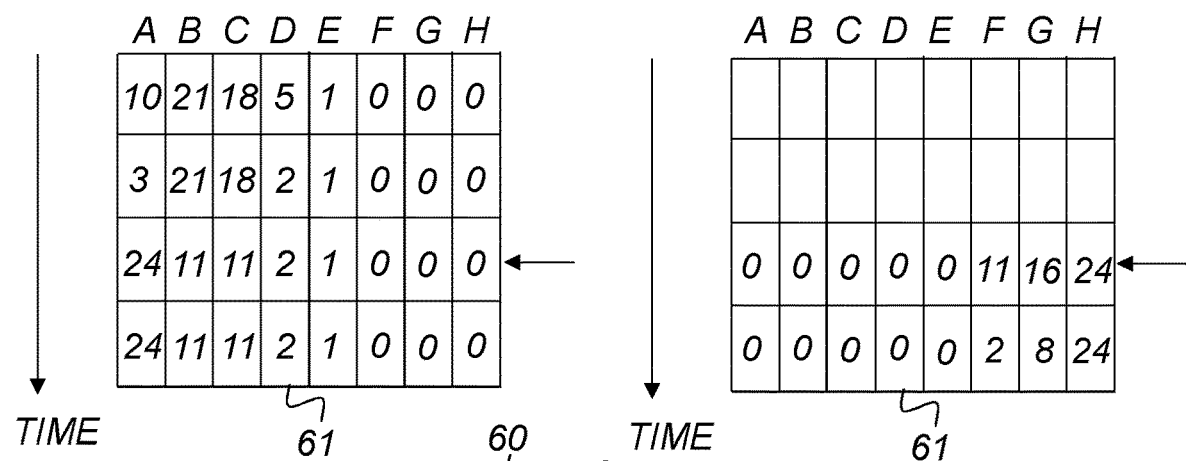
Figure 11:
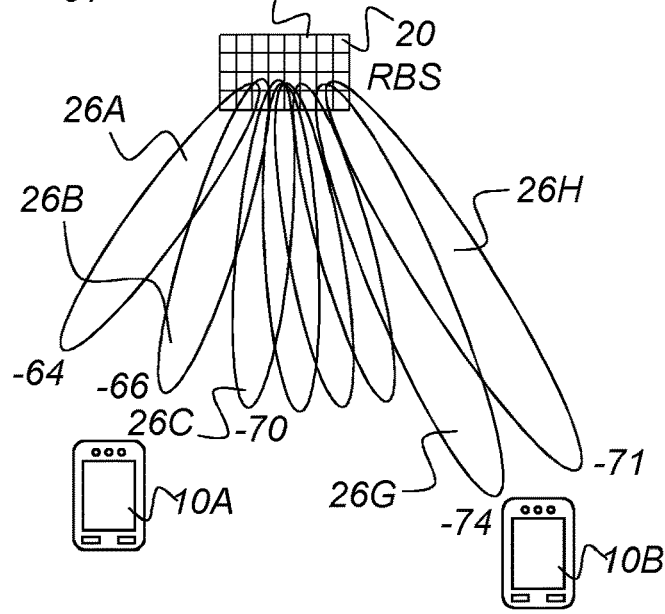

FIG. 11 illustrates an application of individual subsets bias values on a beam application decision for more than one UE. A first UE 10A is connected to a RBS 20 and three beams 26A-C have favourable channel gains. Also, other factors are considered giving bias values further favouring beams B and C, according to the first two rows of the bias values for UE A shown at the left part of the middle of the figure. A second UE 10B comes into the coverage of RBS 20, in particular of the beams 26G and 26H, as illustrated in the top part of the figure. In this part of the figure, the channel responses based on UE measurements are indicated. In the third row of the illustrated bias values for the UE A and UE B, the bias values are calculated considering the co-existence of the UEs 10A and 10 B. In order to avoid interference between the transmission to and from the different UEs, the bias values are selected to favour beams to the two UEs located far from each other. The bias values for UE 10A thus favour beam 26A relative to the beams 26B and 26C, whereas the bias values for UE 10B favour beam 26H relative to the beam 26G. This is illustrated in the bottom part of the figure, where the biased channel gain estimations are indicated. Assigning of beams 26A and 26H for the respective UE is thereby favourable.

Individual bias values can thus be computed for each UE. However, these individual bias values may take the existence of the other UEs into consideration.

Referring back to FIG. 3, a common procedure for calculating bias values for both TRP1 25A and TRP2 25B, even if they belong to different radio base stations, will open up for a common strategy. If UE 10C is planned to be assigned to beam 26B, TRP1 25A may apply bias values, in analogy with what is shown in FIG. 7, turning beam 26E into the most advantageous assignment choice. If the bias value for beam 26E weights the beam at least 5 dB higher than the bias value for beam 26D, the interference in UE 10C from beam 26D can be avoided.

Furthermore, by processing the bias values, in analogy with what is shown in FIG. 7, for the UE 10B and for the UE 10C at the same time, the bias values for UE 10B may be set to increase the relative channel gain of beam 26C compared to beam 26B such that beam 26C is selected. Beam 26B can then be assigned to UE 10C without extensive interference with UE 10B. The UE 10B will perhaps experience a somewhat lower channel gain, but still on an acceptable level.

In a preferred embodiment, the connection quality predictions are estimations utilizing statistical information about used beams and the transmission experience thereof. Such estimations gives a long term view of the environment. In this connection, a long term is defined as more than one transmission time entity.

In other words, the step S15 of calculating the set of bias values or the step S4 of calculating connection quality predictions utilizes statistical information about used beams and the transmission experience thereof. This gives a long term view of the environment.

Figure 12:
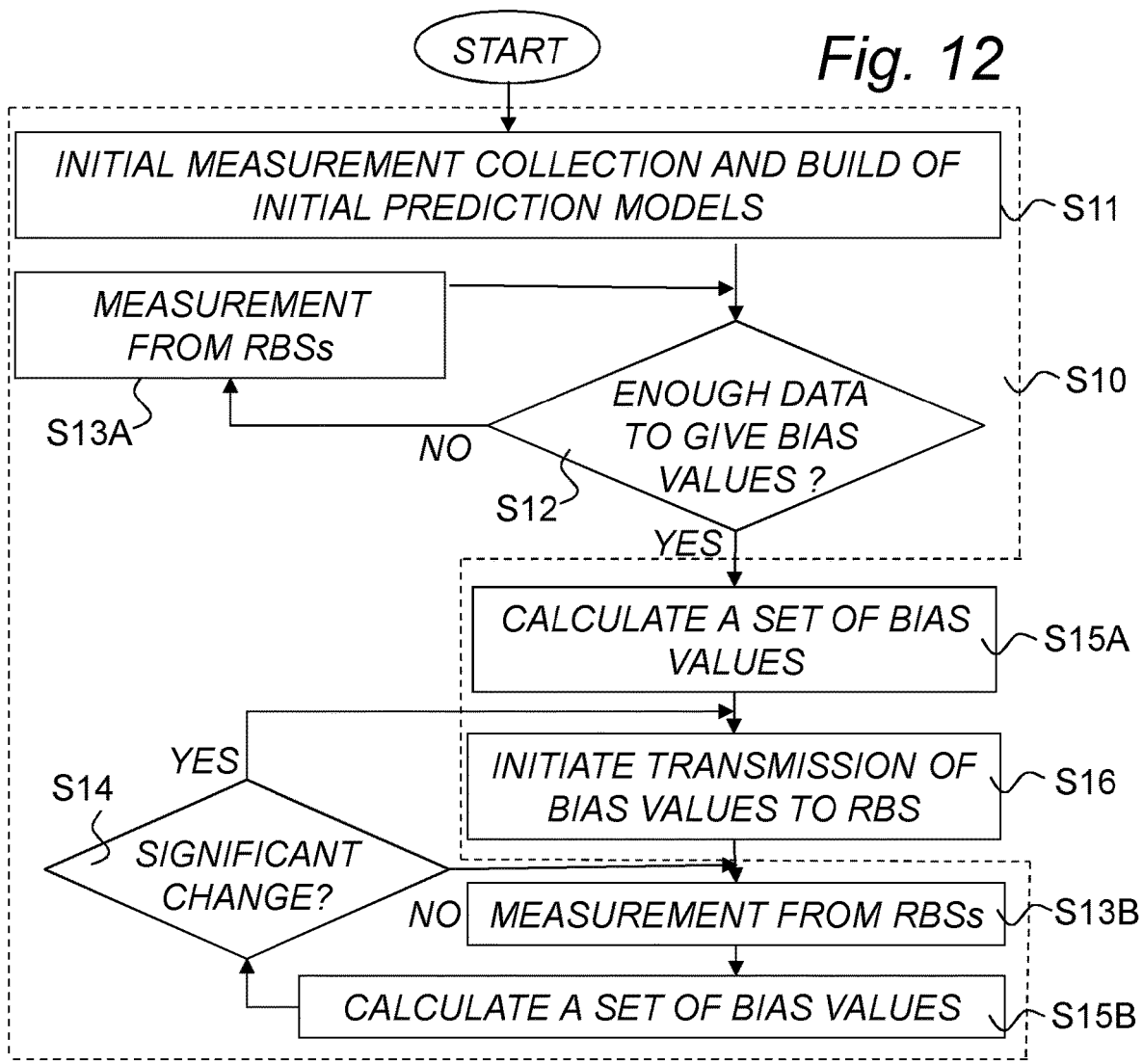
FIG. 12 is a schematic illustration of a procedure of learning and sending updates of bias values.

The statistical processing of the available information can be performed in many different ways. Preferably, some kind of updating procedure is utilized so that a provisional result can be used for weighting the channel gain estimations in one time slot, while the result simultaneously is updated by further information. One possible approach, intended to be performed in a network node, e.g. in a RCF, is illustrated in FIG. 12. Step S10 of obtaining measures of previous traffic load, radio quality and/or beam assignments is illustrated to have a number of sub-steps. In step S11, initial measurement collection is performed and initial prediction models are built. The initial measurement collection could be e.g. historically data which relates to BRSRP, used beam(s) for the users and possible interfering beams together with experienced users quality. In S12, it is determined if the amount of data is sufficient to create a reliable set of bias values. If not, the process continues with step S13A, where additional measurements are received from RBSs. If the amount of data is sufficient to create a reliable set of bias values, the procedure continues to steps S15A and S16. The collection of measurements from the RBSs continues in step 13B and new bias values are calculated in step S15B. If the measurements and/or calculated bias values indicate a significant change, as checked in step S14, a new set of bias values is transmitted to the RBS. Such a procedure reduces the amount of signalling between the calculating network node, e.g. the RCF, and the RBSs. Only when a significant change in bias values occurs, new bias values are transmitted to the RBSs. The sets of bias values are thereby utilized until a new updated set is received. The bias values are thus, after an initial learning phase in the RCF, continuously updated, but bias updating will not necessarily be for every UE/beam/TRP combination per every time slot. Rather the updating can be locally in RBS, or updated from external server, per individual bias element $b_{ij}$ and with an update frequency depending on need. Furthermore, level thresholds, "hysteresis", may be applied to the bias updates to reduce the amount of small changes with low significance, as indicated in FIG. 12.

In a preferred embodiment, the connection quality predictions are connection quality predictions at least at a time for a next beam assignment. Depending on the update rate, the connection quality predictions may be valid for more than one next beam assignment.

Figure 13:
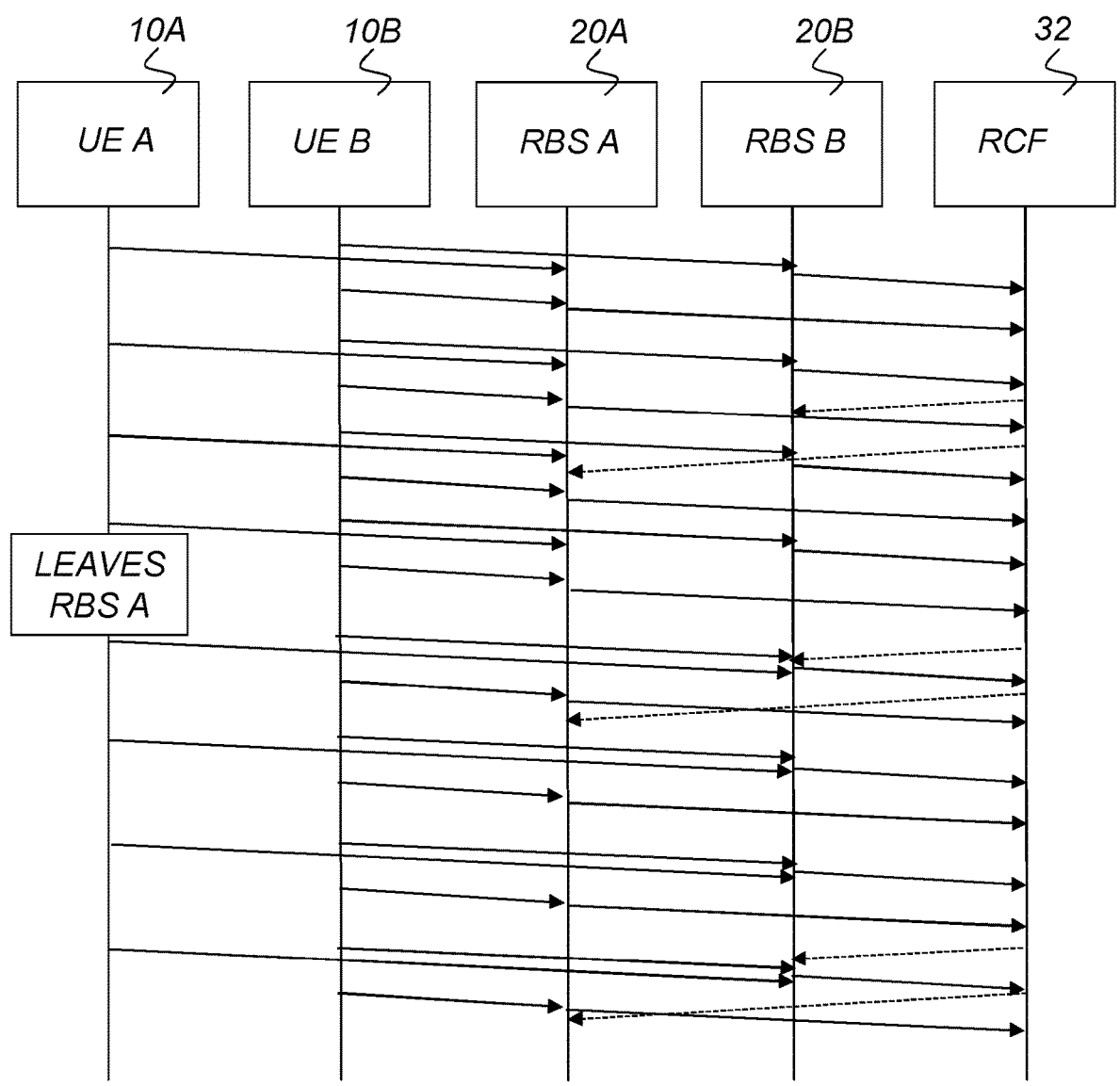
FIG. 13 illustrates asynchronous reception of measurements, measurement aggregates and sending of bias values.

FIG. 13 illustrates the asynchronous reception of measurements, measurement aggregates and sending of bias values. The UEs 10A and 10B sends measurements to the RBSs 20A and 20B. The RBSs 20A and 20B compile the measurements and forward them to the RCF 32. The measurements and aggregated measurements are illustrated by full arrows in the figure. The RCF 32 analyses the aggregated measurements, possibly together with other information, and calculates bias values. Theses bias values are occasionally transmitted to the RBSs 20A and 20B to be applied in the beam assignment procedure. The transfer of bias values is indicated with dotted arrows in the figure. The time between the transmissions of measurements may be shorter than, typically considerably shorter than, the time between consecutive issues of bias values.

Figure 14:
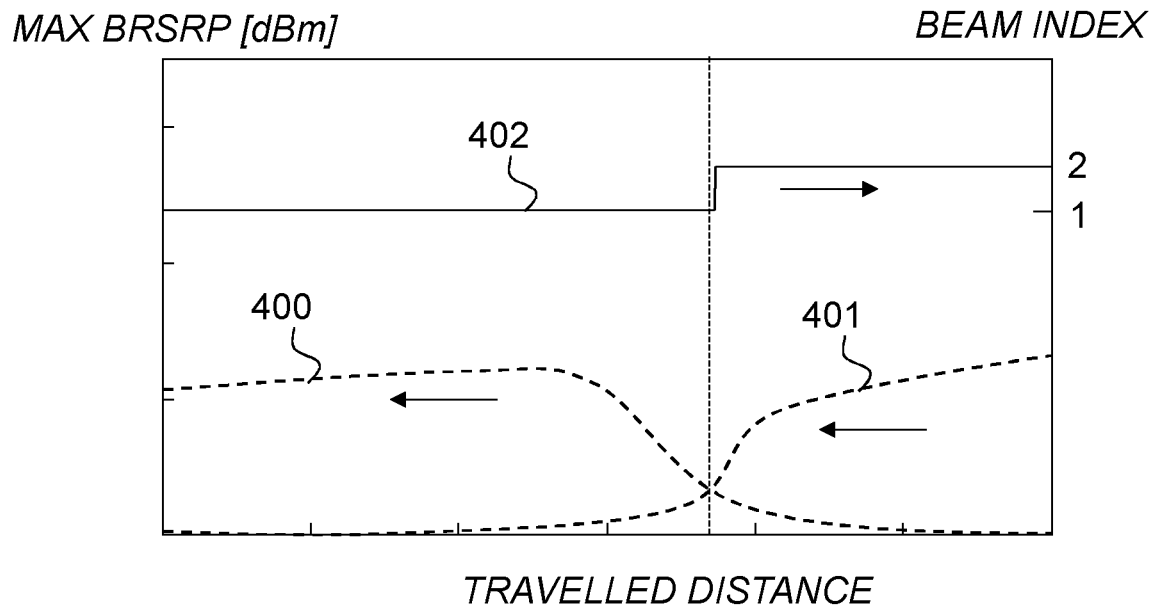
FIGS. 14-15 are diagrams illustrating beam power and assigned beams for moving UEs.
Figure 15:
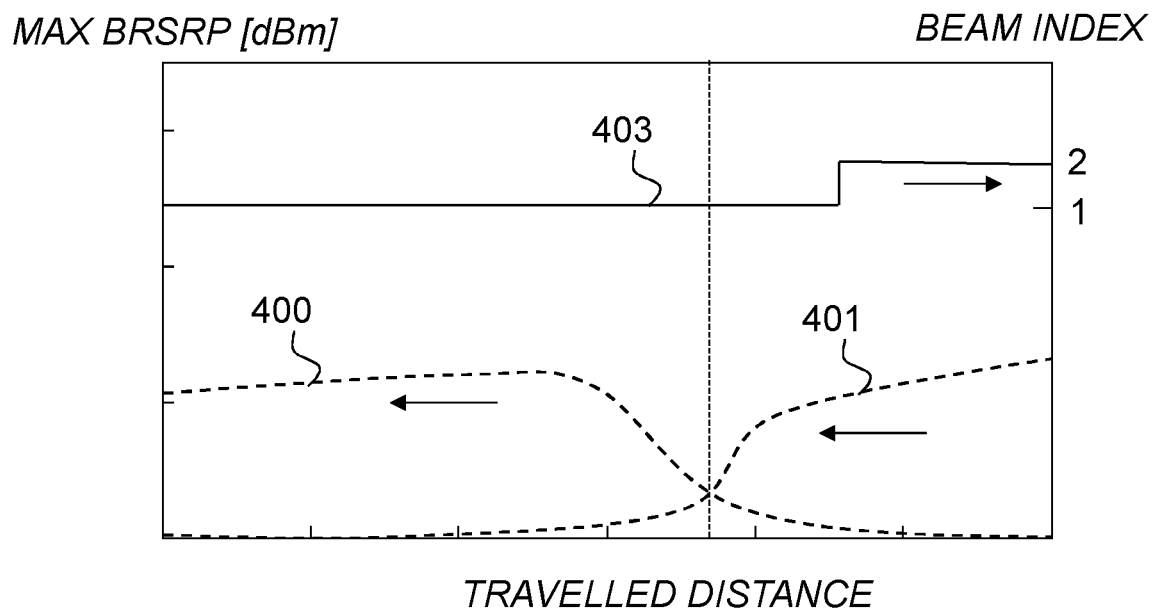

Fast moving UEs in a communication system may cause problems in beam assignment according to prior art. Dependent on the distance between the UE and the TRP, or different environment properties such as reflection or blocking, beams can have a small coverage area. For example for a vehicle moving close past a TRP, the coverage area for a beam can be less than a meter; and thus if the vehicle speed is high, the distance can be covered in a very short time. Fast beam selection decisions based on instantaneous measurements contain an implicit prediction error. Typically, measurements are taken during the preceding time slot(s) and optionally passed through an averaging filter, which output serves as a prediction of the next time slot connection quality. For a UE moving fast past (and close to) a TRP, this prediction error will increase, as the UE may in the next time slot have passed through one or several of the measured beams. As seen in FIGS. 14 and 15, the same TRP is passed at different speeds. The curves 400 and 401 illustrates the measures BRSRP for beam 1 and beam 2, respectively. Curves 402 and 403 indicates which beam is allocated. In FIG. 14, the speed is relatively low and a switch between beam index 1 and beam index 2 occurs soon after the UE passes the point where the channel gains of the different TRPs are equal. In FIG. 15, the speed of the UE is higher, and due to the latency in the reporting and deciding, a switch between the two beams is initiated much later. Inefficient beam allocations degrade throughput at higher speeds.

Figure 16A:
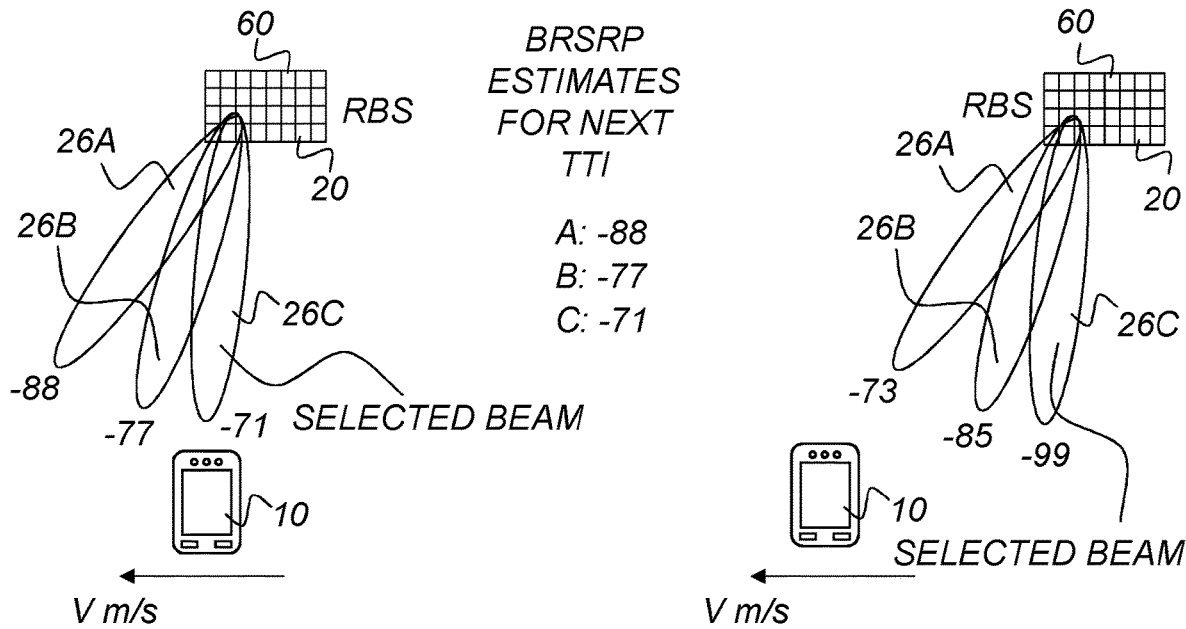
FIG. 16A is an illustration of beam selection for fast moving UE using only channel gain estimations.

It would have been beneficial to adapt the beam allocation in view of a probable location of the UE at the time of a next beam allocation. In FIG. 16A, a fast moving (V m/s) UE 10 passes a TRP of a RBS 20. The channel gain estimations are based on measurements at time 1, i.e. the left part of the figure. The conditions at that time favours a selection of beam 26C. At time 2, i.e. the right part of the figure, the BRSRP estimates from time 1 are used for beam assignment. The selected beam will therefore still be beam 26C. However, as seen in the right part of the figure, beam 26A now is the best choice due to the motion of the UE 10. In prior art, there is no specified way of adjusting beam allocation to a predicted trajectory: The trajectory prediction itself can indeed be made also within the RBS or in an external node, but a means of influencing the fast beam allocation methods was previously missing. Such a way to adjust the beam allocation to a predicted trajectory is however enabled by the ideas presented here by e.g. using a bias matrix and ML.

In one aspect, the present technology aims to solve this problem by providing a means of weighing in what is known by some certainty about this positioning error. As an example, time stamped statistics from UE and RBS measurements for a period of time are stored, per UE. Typically this means the allocated TRP and beam, and the signal quality, e.g. BRSRP. By using this recorded history it is possible to, for the upcoming time slot(s), predict the estimated signal quality for the beam/TRP combinations that are likely to be eligible servers in the close future. The difference of these signal quality estimates and the current, measurement based, signal quality is entered into a bias matrix B. The matrix is indexed by UE, beam/TRP and time, i.e. one or more future time slots.

Figure 16B:
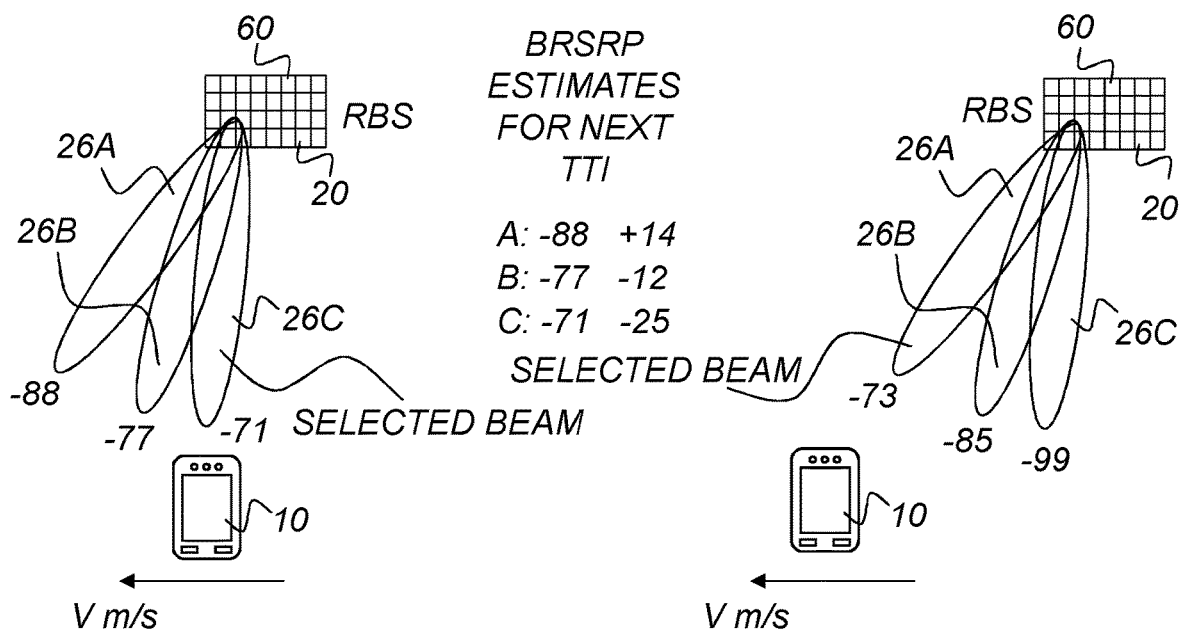
FIG. 16B is an illustration of beam selection for fast moving UE using biased channel gain estimations.

Thus, the effect on the predicted connection quality can be compensated by downgrading the selection weight of the beams that can be assumed to have already been passed, and upgrade the beam(s) that are likely to be better serving in the next time slot, see FIG. 16B. Measurements taken at time 1 are not completely relevant at time 2 due to movement of the UE 10. However, a mobility detection mechanism could anticipate the movement, and adjust for the channel estimation error by introducing bias to the beam signal quality estimates. In the particular example of FIG. 16B, the bias values are +14 dB, −12 dB and −25 dB, respectively, which gives biased channel gain estimations of −74 dB, −89 dB and −96 dB, respectively. These values are in relative good agreement with the actual situation at time t2, i.e. in the right-hand part of the figure. Beam 26A will be selected. The used bias values can be accumulated, based on measurements reported by previous traffic. This is a typical task for a Machine Learning algorithm, as will be discussed further below.

FIGS. 16A and 16B show intra TRP mobility. However, the method is applicable also to inter TRP and inter node mobility.

If several users are to be scheduled in the same radio resource space, i.e. frequency/time, in the same TRP, or in the same area, there are often resource allocation conflicts. In order to achieve a good system wide, as opposed to local TRP, resource usage, there is a need for balance the resource need in between TRPs. Likewise, resource need can be balanced over time, given the delivery time criticality of the data. For instance, video frames may be delayed if the playout buffer is reasonably full. Voice over IP (VoIP) can be delayed freely until the next 40 ms time slot, when immediate delivery becomes critical, etc.

The proposed technology enables coordination of beam assignment for multiple users, when individual UE resource usage is predicted. Such beam assignment may be statistics based. For example, with reference to FIG. 3, an implementation example can be given, considering a recorded history of measurements being used for predicting estimates of system level performance impact of possible beam allocations.

Traffic load and radio quality measurements H for the target TRP:s are collected, system wide or in a smaller vicinity. For upcoming time slots, estimates of traffic load and connection quality for probable beam allocation combinations, for all traffic, is predicted. Predict a best beam/TRP for each UE estimated upcoming time slots as in the mobility example above. This might include application of the previous mobility bias B. Predict per beam/TRP activity for each UE.

Combine the estimates in the previous step to find a system wide optimal allocation, i.e. including the impact of estimated interference, into channel estimates H. Calculate a bias B' based on the difference of the first channel estimates H and the estimates adjusted for interference H', $$b'_i = \max_{ij} H - \left(\min_{ij} k * H' + m\right),$$

where k and m are factors providing a margin. They may in the simplest form be set to "good enough" parameter values. In a more advanced embodiment they may be calculated based on system performance feedback. Note that in this case, the bias needs to cater for both radio connection quality and load impact, a problem for which stringent or even approximate calculation is non-trivial. Hence this 'practical' solution is proposed.

For each active UE and beam/TRP, assign bias values B' as in the mobility example above, to encourage beam assignments that avoid interference on other UEs.

Figure 17:
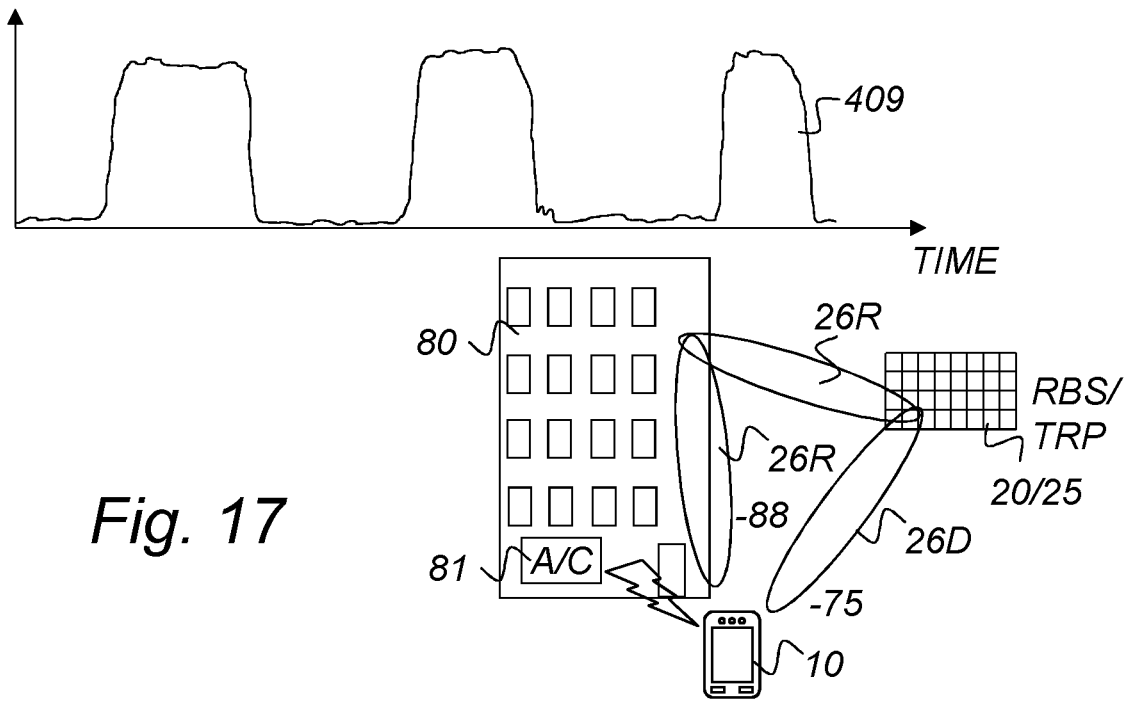
FIG. 17 illustrates scheduling predicted penalty for certain beams.

By long term analysis of link performance, by e.g. ML methods, recurring disturbance of channel quality may be identified. Within the scope of the invention is the ability of supporting schemes where allocation of some beams at some times of day is suppressed. With reference to FIG. 17, a situation is illustrated where a non-controllable interference source is present. In this particular example, an A/C device 81 in a building 80 produces interference signals in a same frequency range as the transmissions within the communication system. A recurring disturbance 409, as illustrated in the diagram at the top of the figure, is detected by a monitoring function. This allows for a control function to apply a scheduled penalty vector P, which is used per active UE in the periods when the interference is estimated to occur. The penalty vector would in the given example be assigned as I identical rows in a bias matrix B" for I active UE:s. In this particular example, a learning function detects that the beam with best estimated path gain is at some recurring time periods in fact not the best one according to the primary channel gain estimations. According to these, a direct beam 26D should be the best one (−75 dB). However, this beam 26D is severely disturbed by the A/C device 81. Instead, the reflected beam 26R, having a lower ranking (−88 dB) by the primary channel gain estimations operates best. This is without knowledge of that the actual disturbance is caused by a non-controllable interference source, the A/C device 81.

An exemplary process is then to collect radio quality measurements and user plane traffic statistics per UE and beam/TRP on a longer time scale. Time periods are identified where radio quality measurements map poorly to the resulting user plane performance, in terms of throughput/latency, VoIP interruptions etc. A penalty value $p_j$ is assign to the beams/TRP that are affected during this time period, resulting in a vector $P=[p_1 \ldots p_j \ldots p_J]$ per time period. For the identified time periods, the channel estimates are adjusted. That is assigning penalties per beam for each UE:

$$B'' = \begin{bmatrix} P_1 \\ \vdots \\ P_J \end{bmatrix}, \text{ where } P_1 \ldots P_J = P$$

This bias may then be applied on top of other bias matrices, e.g. the previously described, resulting in beam choice j by:
choose beam j:

$$h_i = \max_{ij} H \odot B' \odot B''.$$

Note that the objective is not to guarantee absence of interference, which arguably is not possible, but to as much as possible reduce service impact for the total collective of users.

The present ideas do not explicitly cover the specific prediction methods. These methods may range from simple averaging of key features, to more advanced ML. Such methods are, as such, well known by a person skilled in the art.

In a preferred embodiment, the connection quality predictions are estimations utilizing machine learning procedures. In a particular embodiment, the step S15 of calculating the set of bias values utilizes machine learning procedures.

As briefly mentioned above, other external conditions, such as temperature or weather may also be taken into account. Therefore, in a preferred embodiment, the connection quality predictions are estimations further based on non-radio access network conditions. In a particular embodiment, the connection quality predictions are estimations further based on non-radio access network conditions.

The proposed technology may be applied to a network node, which may be a wired or wireless device.

As used herein, the non-limiting terms "User Equipment (UE)", "station (STA)" and "wireless communication device" or "wireless device" may refer to a mobile phone, a cellular phone, a Personal Digital Assistant (PDA) equipped with radio communication capabilities, a smart phone, a laptop or Personal Computer (PC) equipped with an internal or external mobile broadband modem, a tablet PC with radio communication capabilities, a target device, a device to device UE, a machine type UE or UE capable of machine to machine communication, iPAD, Customer Premises Equipment (CPE), Laptop Embedded Equipment (LEE), Laptop Mounted Equipment (LME), Universal Serial Bus (USB) dongle, a portable electronic radio communication device, a sensor device equipped with radio communication capabilities or the like. In particular, the term "UE", the term "Station", the term "wireless device" and the term "wireless communication device" should be interpreted as non-limiting terms comprising any type of wireless device communicating with a network node in a wireless communication system and/or possibly communicating directly with another wireless communication device. In other words, a wireless communication device may be any device equipped with circuitry for wireless communication according to any relevant standard for communication.

As used herein, the term "wired device" may refer to any device configured or prepared for wired connection to a network. In particular, the wired device may be at least some of the above devices, with or without radio communication capability, when configured for wired connection.

As used herein, the non-limiting term "network node" may refer to base stations, access points, network control nodes such as network controllers, radio network controllers, base station controllers, access controllers, and the like. In particular, the term "base station" may encompass different types of radio base stations including standardized base stations such as Node Bs (NB), or evolved Node Bs (eNB) and also macro/micro/pico radio base stations, home base stations, also known as femto base stations, relay nodes, repeaters, radio access points, Base Transceiver Stations (BTS), and even radio control nodes controlling one or more Remote Radio Units (RRU), or the like.

In the following, the general non-limiting term "communication unit" includes network nodes and/or associated wireless devices.

As used herein, the term "network device" may refer to any device located in connection with a communication network, including but not limited to devices in access networks, core networks and similar network structures. The term network device may also encompass cloud-based network devices.

It will be appreciated that the methods and devices described herein can be combined and re-arranged in a variety of ways.

For example, embodiments may be implemented in hardware, or in software for execution by suitable processing circuitry, or a combination thereof.

The steps, functions, procedures, modules and/or blocks described herein may be implemented in hardware using any conventional technology, such as discrete circuit or integrated circuit technology, including both general-purpose electronic circuitry and application-specific circuitry.

Alternatively, or as a complement, at least some of the steps, functions, procedures, modules and/or blocks described herein may be implemented in software such as a computer program for execution by suitable processing circuitry such as one or more processors or processing units.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

According to an aspect of the proposed technology there is provided a radio base station in a cellular communication system. The radio base station is configured to obtain a set of channel gain estimations representing potential transmissions in a set of beams to a user equipment. The set of beams are used by a first TRP. The radio base station is further configured to obtain a set of bias values representing connection quality predictions for a respective beam of the set of beams for transmission to the user equipment. The connection quality predictions are estimations calculated at least from measures of at least one of previous traffic load, previous radio quality of transmissions, and previous beam assignments of the first TRP. The radio base station is further configured to determine a set of biased channel gain estimations by weighting the channel gain estimations in dependence of respective bias values. The radio base station is further configured to initiate a beam assignment based on the biased channel gain estimations.

Figure 18:
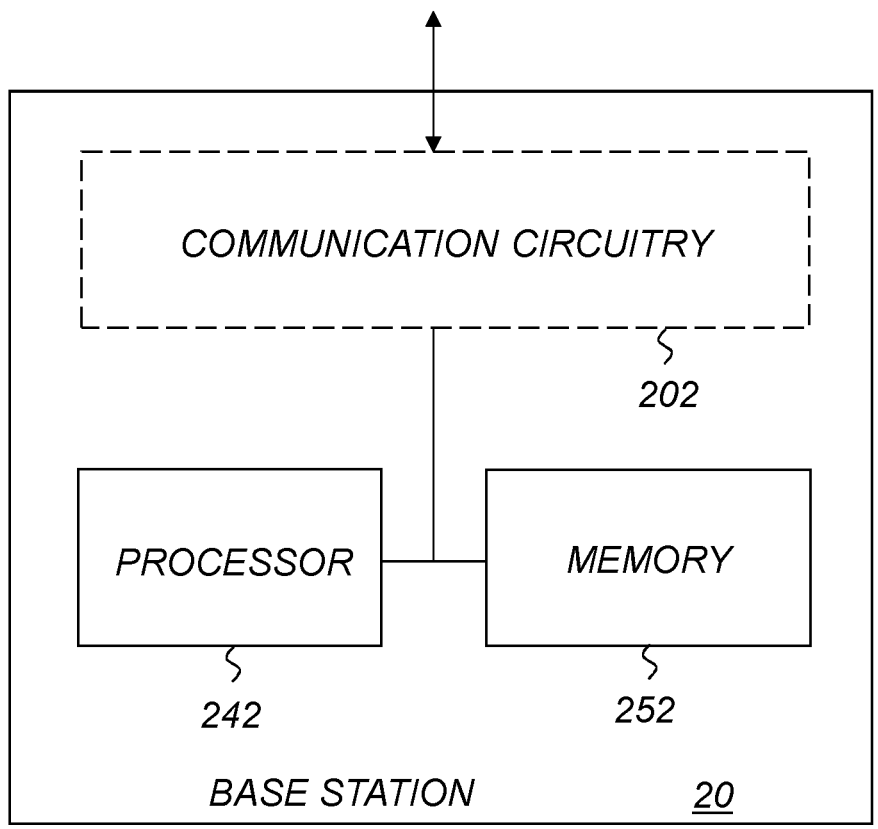
FIG. 18 is a schematic block diagram illustrating an embodiment of a base station.

FIG. 18 is a schematic block diagram illustrating an example of a base station 20, based on a processor-memory implementation according to an embodiment. In this particular example, the base station 20 comprises a processor 242 and a memory 252. The memory 252 comprises instructions executable by the processor 242, whereby the processor 242 is operative to obtain the set of channel gain estimations, to obtain the set of bias values, to determine the set of biased channel gain estimations and to initiate the beam assignment.

In one embodiment, the radio base station is further configured to perform the obtaining of a set of bias values comprising receiving data representing the set of bias values. In a further embodiment, data representing the set of bias values is received from a node configured to provide data representing sets of bias values to a plurality of base stations.

In one embodiment, the radio base station is further configured to perform the obtaining as comprising obtaining of data, based on which the connection quality predictions are estimated, and calculating the connection quality predictions from at least the obtained data.

In one embodiment, the radio base station is further configured to perform the obtaining of a set of channel gain estimations as comprising receiving, from the user equipment, measurements associated with channel gain on the transmissions by the beams, and calculating the channel gain estimations from the measurements.

In one embodiment, the radio base station is further configured to base the channel gain estimations on measurements of reference signal strengths.

Optionally, with reference to FIG. 18, the base station 20 may also include a communication circuitry 202. The communication circuitry 202 may include functions for wired and/or wireless communication with other devices and/or network nodes in the network. In a particular example, the communication circuitry 202 may be based on radio circuitry for communication with one or more other nodes, including transmitting and/or receiving information. The communication circuit 202 may be interconnected to the processor 242 and/or memory 252. By way of example, the communication circuit 202 may include any of the following: a receiver, a transmitter, a transceiver, input/output (I/O) circuitry, input port(s) and/or output port(s). The communication circuit 202 is operative to receive data representing the set of bias values and/or receive the measurements associated with channel gain.

In one embodiment, the bias values constitute corrections for expected beam channel impairments not being reflected in the channel gain estimations.

In one embodiment, the connection quality predictions are connection quality predictions at least at a time for a next beam assignment.

In one embodiment, the connection quality predictions are estimations calculated also from measures of at least one of previous traffic load, previous radio quality of transmissions, and previous beam assignments of a second TRP being in a radio interference relation to the first TRP.

In one embodiment, the connection quality predictions are estimations utilizing statistical information about used beams and the transmission experience thereof, giving a long term view of the environment, wherein long term is defined as more than one transmission time entity.

In one embodiment, the connection quality predictions are estimations utilizing machine learning procedures.

In one embodiment, the radio base station is further configured to perform the obtaining of a set of channel gain estimations for a plurality of user equipments, whereby the radio base station is further configured to estimate the connection quality predictions for the different user equipments in dependence of each other.

In one embodiment, the radio base station is further configured to perform the initiating a beam assignment as comprising performing a beam assignment.

In one embodiment, the connection quality predictions are estimations further based on non-radio access network conditions.

According to another aspect of the proposed technology there is provided a node connected to a cellular communication network. The node is configured to obtain measures of at least one of previous traffic load, previous radio quality of transmissions, and previous beam assignments of a first TRP. The node is further configured to calculate a set of bias values representing connection quality predictions for a set of beams for transmission to a user equipment, using the obtained measures. The set of beams are used by the first TRP. The node is further configured to initiate transmission of the set of bias values to a radio base station managing the set of beams. In one embodiment, the node is a communication network node.

Figure 19:
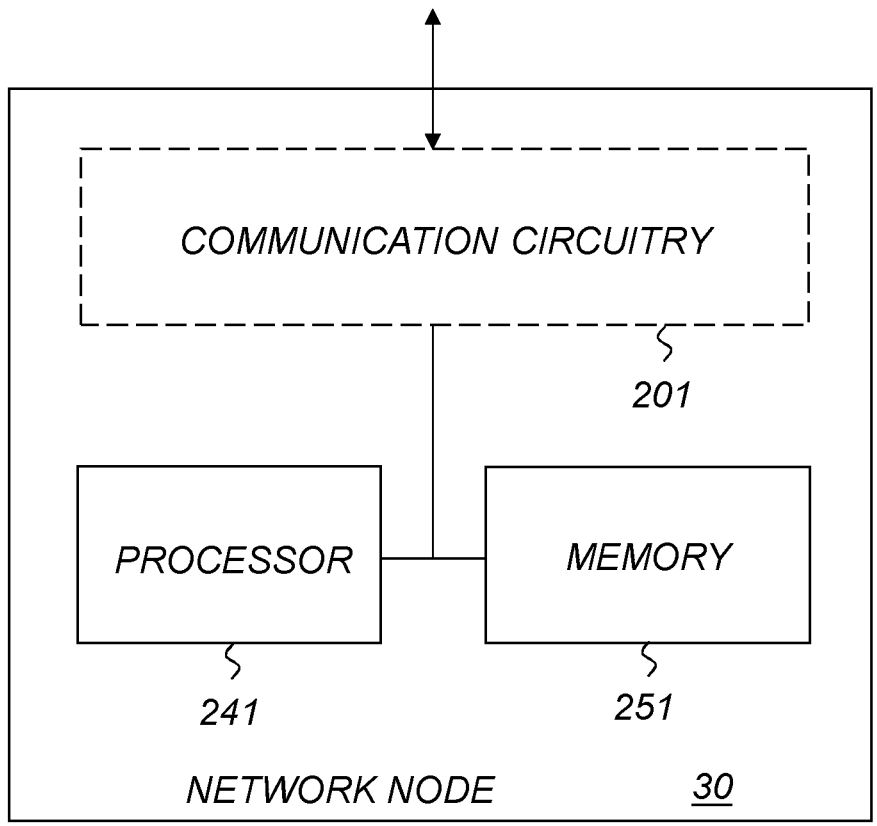
FIG. 19 is a schematic block diagram illustrating an embodiment of a network node.

FIG. 19 is a schematic block diagram illustrating an example of a network node 30, based on a processor-memory implementation according to an embodiment. In this particular example, the network node 30 comprises a processor 241 and a memory 251. The memory 251 comprises instructions executable by the processor 241, whereby the processor 241 is operative to obtain the measures, to calculate the set of bias values and to initiate the transmission of the set of bias values.

In one embodiment, the node is further configured to perform the initiating of transmission as comprising transmission of the set of bias values to the radio base station.

Optionally, with reference to FIG. 19, the network node 30 may also include a communication circuitry 201. The communication circuitry 201 may include functions for wired and/or wireless communication with other devices and/or network nodes in the network. In a particular example, the communication circuitry 201 may be based on radio circuitry for communication with one or more other nodes, including transmitting and/or receiving information. The communication circuit 201 may be interconnected to the processor 241 and/or memory 251. By way of example, the communication circuit 201 may include any of the following: a receiver, a transmitter, a transceiver, input/output (I/O) circuitry, input port(s) and/or output port(s). The communication circuit 201 is operative to perform the transmission of the set of bias values to the radio base station.

In one embodiment, the bias values constitute corrections for expected beam channel impairments not being reflected in channel gain estimations.

In one embodiment, the connection quality predictions are connection quality predictions at least at a time for a next beam assignment.

In one embodiment, the node is further configured to perform the obtaining of measures comprising obtaining measures also of at least one of previous traffic load, previous radio quality of transmissions, and previous beam assignments of a second TRP being in a radio interference relation to the first TRP, and to perform the calculating of the set of bias values is further using said measures of at least one of previous traffic load, previous radio quality of transmissions, and previous beam assignments of the first TRP or the second TRP.

In one embodiment, the node is further configured to perform the calculating of the set of bias values by utilizing statistical information about used beams and the transmission experience thereof, giving a long term view of the environment, wherein long term is defined as more than one transmission time entity.

In one embodiment, the node is further configured to perform the calculating of the set of bias values by utilizing machine learning procedures.

In one embodiment, the node is further configured to perform the obtaining of measures for a plurality of user equipments, whereby the node is further configured to perform the calculation of a set of bias values for said plurality of user equipments in dependence of each other.

In one embodiment, the node is further configured to perform obtaining of measures, the calculating of a set of bias values, and the initiating of a transmission of the set of bias values for a plurality of base stations.

In one embodiment, the connection quality predictions are estimations further based on non-radio access network conditions.

Figure 20:
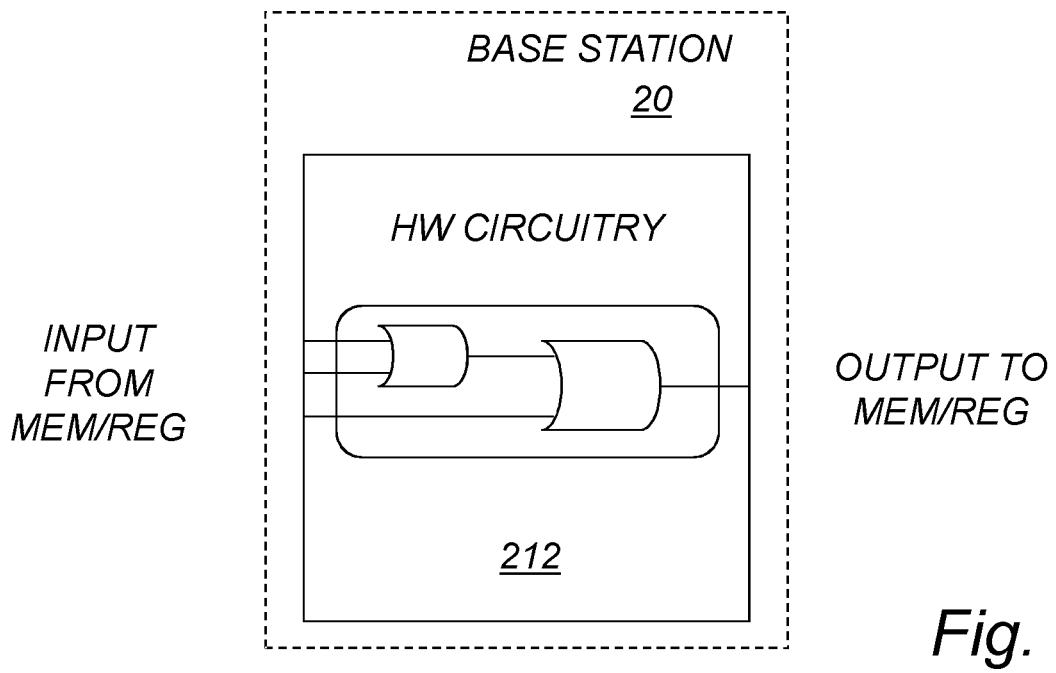
FIG. 20 is a schematic block diagram illustrating an embodiment of a base station based on a hardware circuitry implementation.

FIG. 20 is a schematic block diagram illustrating another example of a base station 20, based on a hardware circuitry implementation according to an embodiment. Particular examples of suitable hardware (HW) circuitry 212 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 21:
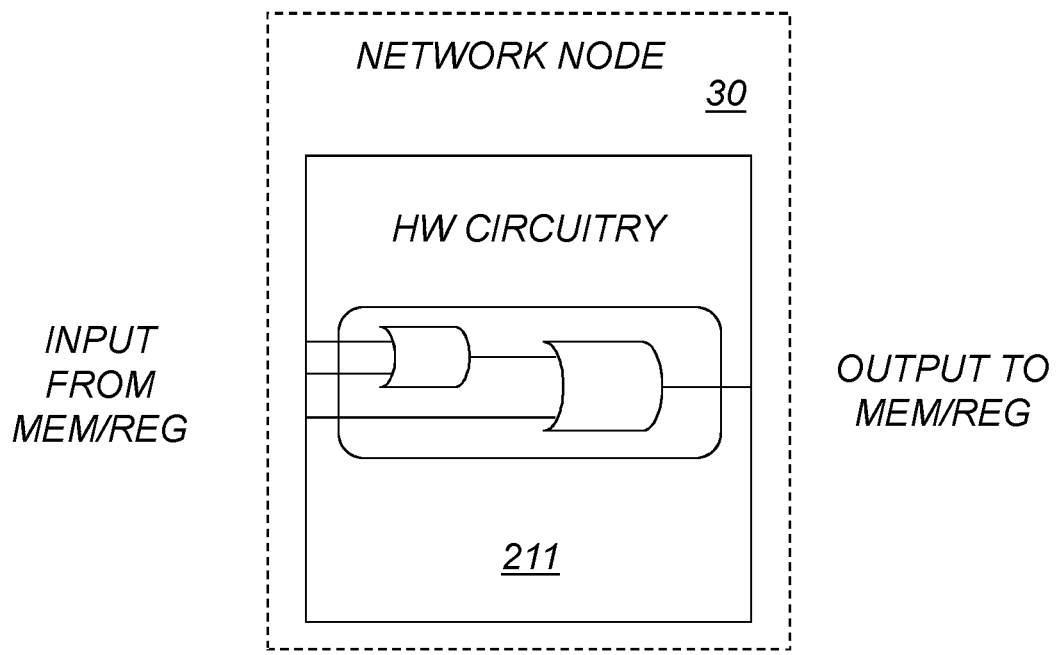
FIG. 21 is a schematic block diagram illustrating an embodiment of a network node based on a hardware circuitry implementation.

FIG. 21 is a schematic block diagram illustrating another example of a network node 30, based on a hardware circuitry implementation according to an embodiment. Particular examples of suitable hardware (HW) circuitry 211 include one or more suitably configured or possibly reconfigurable electronic circuitry, e.g. Application Specific Integrated Circuits (ASICs), Field Programmable Gate Arrays (FPGAs), or any other hardware logic such as circuits based on discrete logic gates and/or flip-flops interconnected to perform specialized functions in connection with suitable registers (REG), and/or memory units (MEM).

Figure 22:
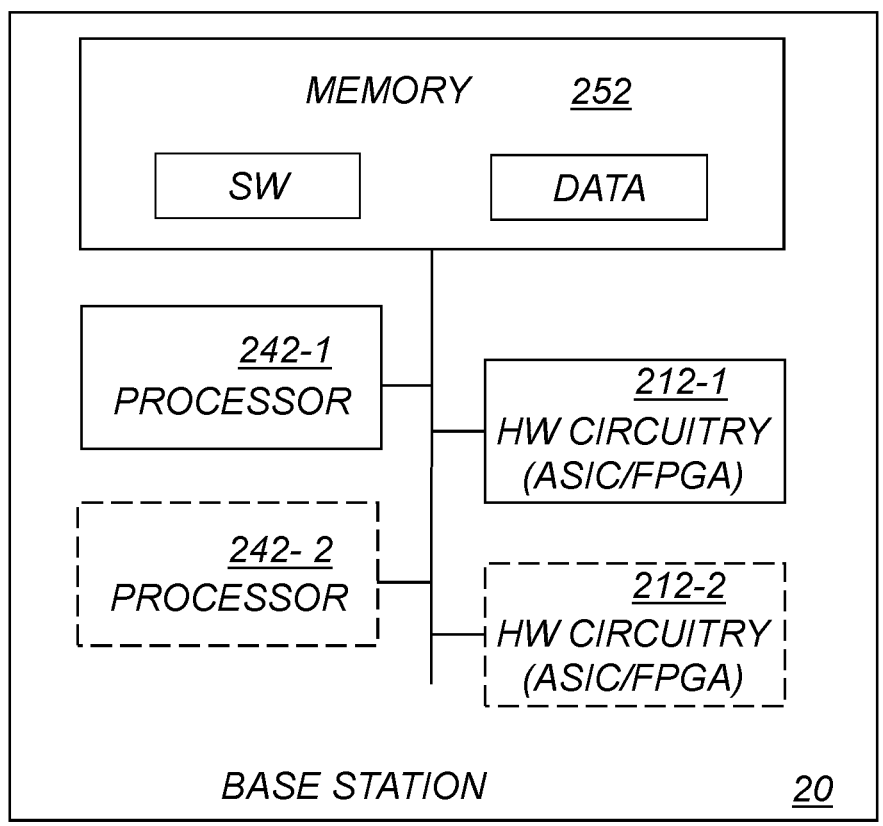
FIG. 22 is a schematic block diagram illustrating another embodiment of a base station based on combination of both processor and hardware circuitry.

FIG. 22 is a schematic block diagram illustrating yet another example of a base station 20, based on combination of both processor(s) 242-1, 242-2 and hardware circuitry 212-1, 212-2 in connection with suitable memory unit(s) 252. The base station 20 comprises one or more processors 242-1, 242-2, memory 252 including storage for software and data, and one or more units of hardware circuitry 212-1, 212-2 such as ASICs and/or FPGAs. The overall functionality is thus partitioned between programmed software (SW) for execution on one or more processors 242-1, 242-2, and one or more pre-configured or possibly reconfigurable hardware circuits 212-1, 212-2 such as ASICs and/or FPGAs. The actual hardware-software partitioning can be decided by a system designer based on a number of factors including processing speed, cost of implementation and other requirements.

Figure 23:
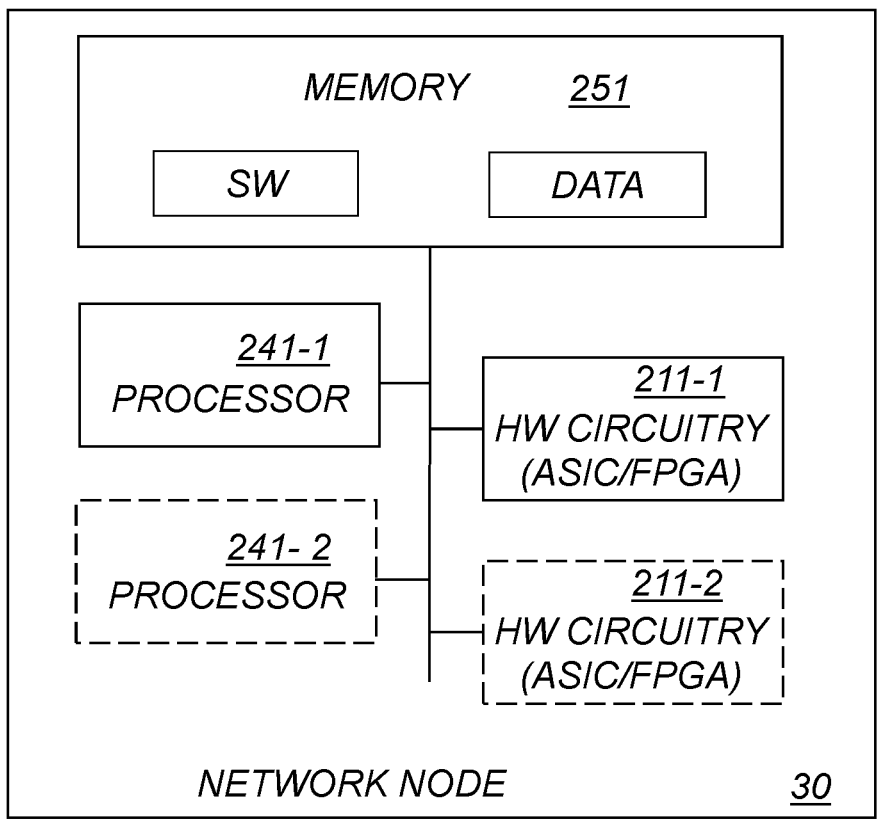
FIG. 23 is a schematic block diagram illustrating another embodiment of a network node based on combination of both processor and hardware circuitry.

FIG. 23 is a schematic block diagram illustrating yet another example of a network node 30, based on combination of both processor(s) 241-1, 241-2 and hardware circuitry 211-1, 211-2 in connection with suitable memory unit(s) 251. The network node 30 comprises one or more processors 241-1, 241-2, memory 251 including storage for software and data, and one or more units of hardware circuitry 211-1, 211-2 such as ASICs and/or FPGAs. The overall functionality is thus partitioned between programmed software (SW) for execution on one or more processors 241-1, 241-2, and one or more pre-configured or possibly reconfigurable hardware circuits 211-1, 211-2 such as ASICs and/or FPGAs. The actual hardware-software partitioning can be decided by a system designer based on a number of factors including processing speed, cost of implementation and other requirements.

Alternatively, or as a complement, at least some of the steps, functions, procedures, modules and/or blocks described herein may be implemented in software such as a computer program for execution by suitable processing circuitry such as one or more processors or processing units.

The flow diagram or diagrams presented herein may therefore be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

Examples of processing circuitry includes, but is not limited to, one or more microprocessors, one or more Digital Signal Processors (DSPs), one or more Central Processing Units (CPUs), video acceleration hardware, and/or any suitable programmable logic circuitry such as one or more Field Programmable Gate Arrays (FPGAs), or one or more Programmable Logic Controllers (PLCs).

It should also be understood that it may be possible to re-use the general processing capabilities of any conventional device or unit in which the proposed technology is implemented. It may also be possible to re-use existing software, e.g. by reprogramming of the existing software or by adding new software components.

Figure 24:
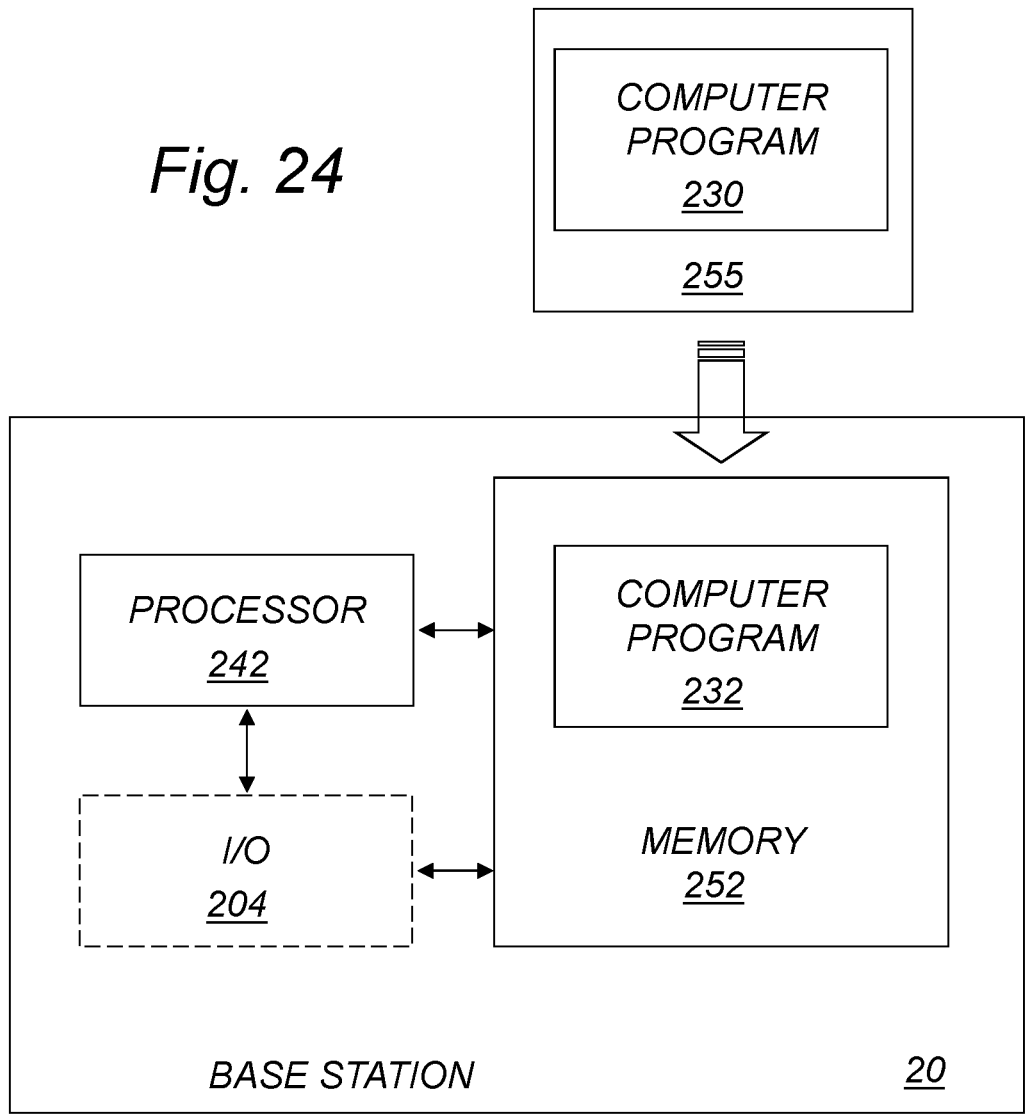
FIG. 24 is a schematic diagram illustrating an embodiment of a computer-implementation of a base station.

FIG. 24 is a schematic diagram illustrating an embodiment of a computer-implementation of a base station 20. In this particular embodiment, at least some of the steps, functions, procedures, modules and/or blocks described herein are implemented in a computer program 232, which is loaded into the memory 252 for execution by processing circuitry including one or more processors 242. The processor(s) 242 and memory 252 are interconnected to each other to enable normal software execution. An optional input/output device 204 may also be interconnected to the processor(s) 242 and/or the memory 252 to enable input and/or output of relevant data such as input parameter(s) and/or resulting output parameter(s).

Figure 25:
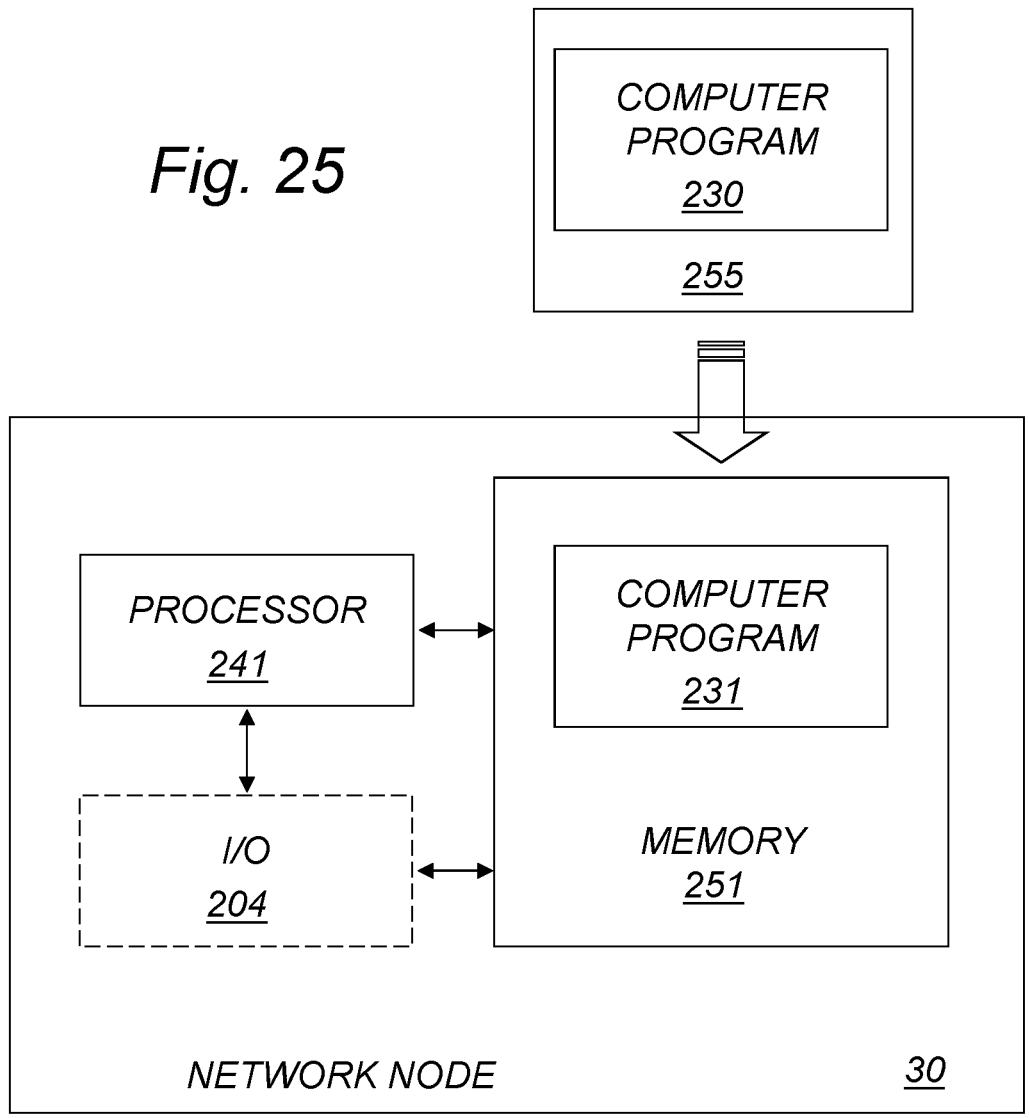
FIG. 25 is a schematic diagram illustrating an embodiment of a computer-implementation of a network node.

FIG. 25 is a schematic diagram illustrating an embodiment of a computer-implementation of a network node 30. In this particular embodiment, at least some of the steps, functions, procedures, modules and/or blocks described herein are implemented in a computer program 231, which is loaded into the memory 251 for execution by processing circuitry including one or more processors 241. The processor(s) 241 and memory 251 are interconnected to each other to enable normal software execution. An optional input/output device 204 may also be interconnected to the processor(s) 241 and/or the memory 251 to enable input and/or output of relevant data such as input parameter(s) and/or resulting output parameter(s).

The term 'processor' should be interpreted in a general sense as any system or device capable of executing program code or computer program instructions to perform a particular processing, determining or computing task.

The processing circuitry including one or more processors 241, 242 is thus configured to perform, when executing the computer program 231, 232, well-defined processing tasks such as those described herein. The terms "processing circuitry" and "processor" will in the present disclosure be used as synonymous expressions.

The processing circuitry does not have to be dedicated to only execute the above-described steps, functions, procedure and/or blocks, but may also execute other tasks.

In a particular embodiment, with reference to FIG. 24, the computer program 232 comprises instructions, which when executed by at least one processor 242, cause the processor(s) 242 to obtain a set of channel gain estimations representing potential transmissions in a set of beams to a user equipment. The set of beams are used by a first TRP. The computer program 232 comprises further instructions, which when executed by the processor(s) 242, cause the processor(s) 242 to obtain a set of bias values representing connection quality predictions for a respective beam of the set of beams for transmission to the user equipment. The connection quality predictions are estimations calculated at least from measures of at least one of previous traffic load, previous radio quality of transmissions, and previous beam assignments of the first TRP. The computer program 232 comprises further instructions, which when executed by the processor(s) 242, cause the processor(s) 242 to determine a set of biased channel gain estimations by weighting the channel gain estimations in dependence of respective bias values. The computer program 232 comprises further instructions, which when executed by the processor(s) 242, cause the processor(s) 242 to initiate a beam assignment based on the biased channel gain estimations.

In a particular embodiment, with reference to FIG. 25, the computer program 231 comprises instructions, which when executed by at least one processor 241, cause the processor(s) 241 to obtain measures of at least one of previous traffic load, previous radio quality of transmissions, and previous beam assignments of a first TRP. The computer program 231 comprises further instructions, which when executed by the processor(s) 241, cause the processor(s) 241 to calculate a set of bias values representing connection quality predictions for a set of beams for transmission to a user equipment, using the obtained measures. The set of beams is used by the first TRP. The computer program 231 comprises further instructions, which when executed by the processor(s) 241, cause the processor(s) 241 to initiate transmission of the set of bias values to a radio base station managing the set of beams.

The proposed technology also provides a carrier comprising the computer program, wherein the carrier is one of an electronic signal, an optical signal, an electromagnetic signal, a magnetic signal, an electric signal, a radio signal, a microwave signal, or a computer-readable storage medium.

By way of example, with reference to FIGS. 24 and 25, the software or computer program 230; 231; 232 may be realized as a computer program product, which is normally carried or stored on a computer-readable medium 255; 251; 252, in particular a non-volatile medium. The computer-readable medium may include one or more removable or non-removable memory devices including, but not limited to a Read-Only Memory (ROM), a Random Access Memory (RAM), a Compact Disc (CD), a Digital Versatile Disc (DVD), a Blu-ray disc, a Universal Serial Bus (USB) memory, a Hard Disk Drive (HDD) storage device, a flash memory, a magnetic tape, or any other conventional memory device. The computer program may thus be loaded into the operating memory of a computer or equivalent processing device for execution by the processing circuitry thereof.

Figure 26:
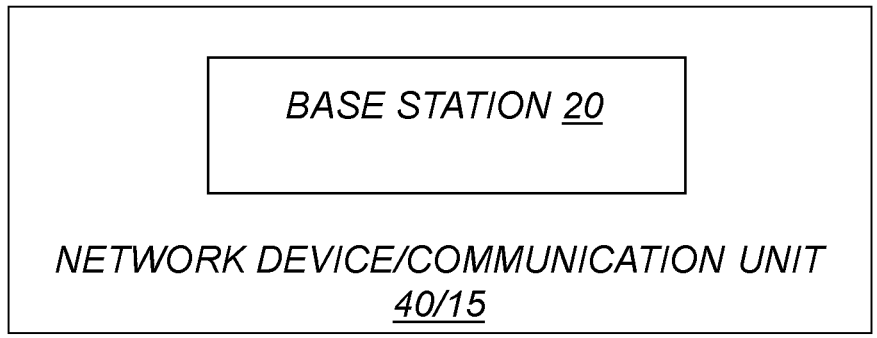
FIG. 26 is a schematic block diagram illustrating an embodiment of a network device.

FIG. 26 is a schematic block diagram illustrating an example of a network device (ND) 40 comprising a base station 20 according to any of the embodiments. According to an aspect, there is provided a network device 40 comprising a base station 20 as described herein.

Figure 27:
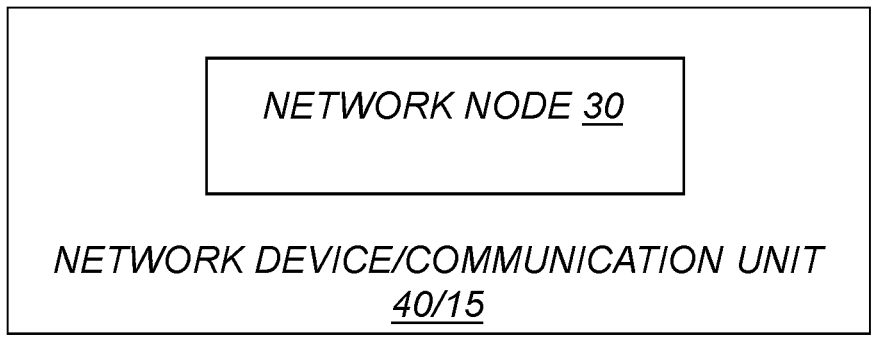
FIG. 27 is a schematic block diagram illustrating another embodiment of a network device.

FIG. 27 is a schematic block diagram illustrating an example of a network device (ND) 40 comprising a network node 30 according to any of the embodiments. According to an aspect, there is provided a network device 40 comprising a network node 30 as described herein.

The network device may be any suitable network device in the wireless communication system, or a network device in connection with the wireless communication system. By way of example, the network device may be a suitable network node such a base station or an access point. However, the network device may alternatively be a cloud-implemented network device.

According to another aspect, there is provided a communication unit 15 in a wireless communication system, wherein the communication unit 15 comprises a network node 30 or a base station 20 as described herein. The communication unit may be any suitable communication unit in the wireless communication system. By way of example, the communication unit may be a wireless communication device such as a UE, STA or similar end-user device.

The flow diagram or diagrams presented herein may be regarded as a computer flow diagram or diagrams, when performed by one or more processors. A corresponding apparatus may be defined as a group of function modules, where each step performed by the processor corresponds to a function module. In this case, the function modules are implemented as a computer program running on the processor.

The computer program residing in memory may thus be organized as appropriate function modules configured to perform, when executed by the processor, at least part of the steps and/or tasks described herein.

Figure 28:
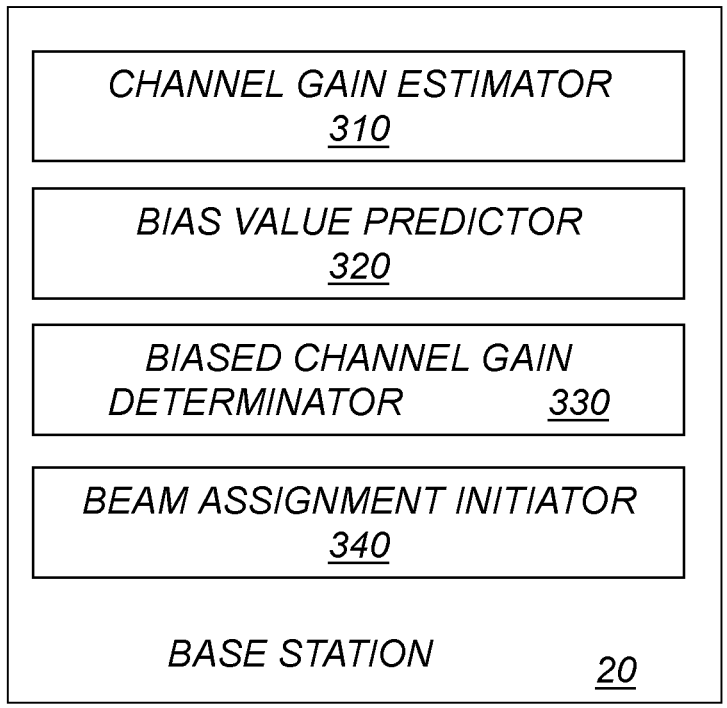
FIG. 28 is a schematic diagram illustrating an embodiment of a base station.

FIG. 28 is a schematic diagram illustrating an example of a base station 20 for use in a cellular communication system. The base station 20 comprises a channel gain estimator 310, for obtaining a set of channel gain estimations representing potential transmissions in a set of beams to a user equipment.

The set of beams are used by a first TRP. The base station 20 further comprises a bias value predictor 320, for obtaining a set of bias values representing connection quality predictions for a respective beam of the set of beams for transmission to the user equipment. The connection quality predictions are estimations calculated at least from measures of at least one of previous traffic load, previous radio quality of transmissions, and previous beam assignments of the first TRP. The base station 20 further comprises a biased channel gain determinator 330, for determining a set of biased channel gain estimations by weighting the channel gain estimations in dependence of respective bias values. The base station 20 further comprises a beam assignment initiator 340, for initiating a beam assignment based on the biased channel gain estimations.

Figure 29:
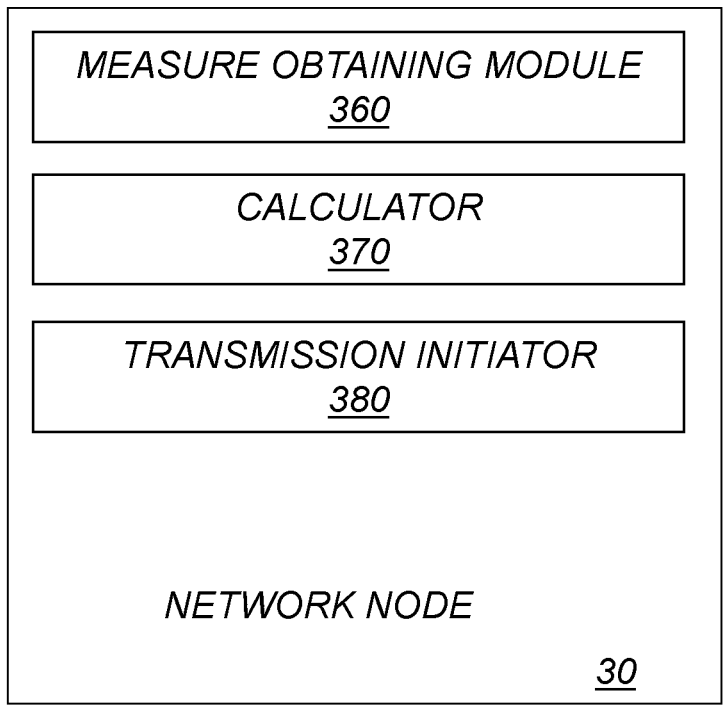
FIG. 29 is a schematic diagram illustrating an embodiment of a network node.
Figure 30:
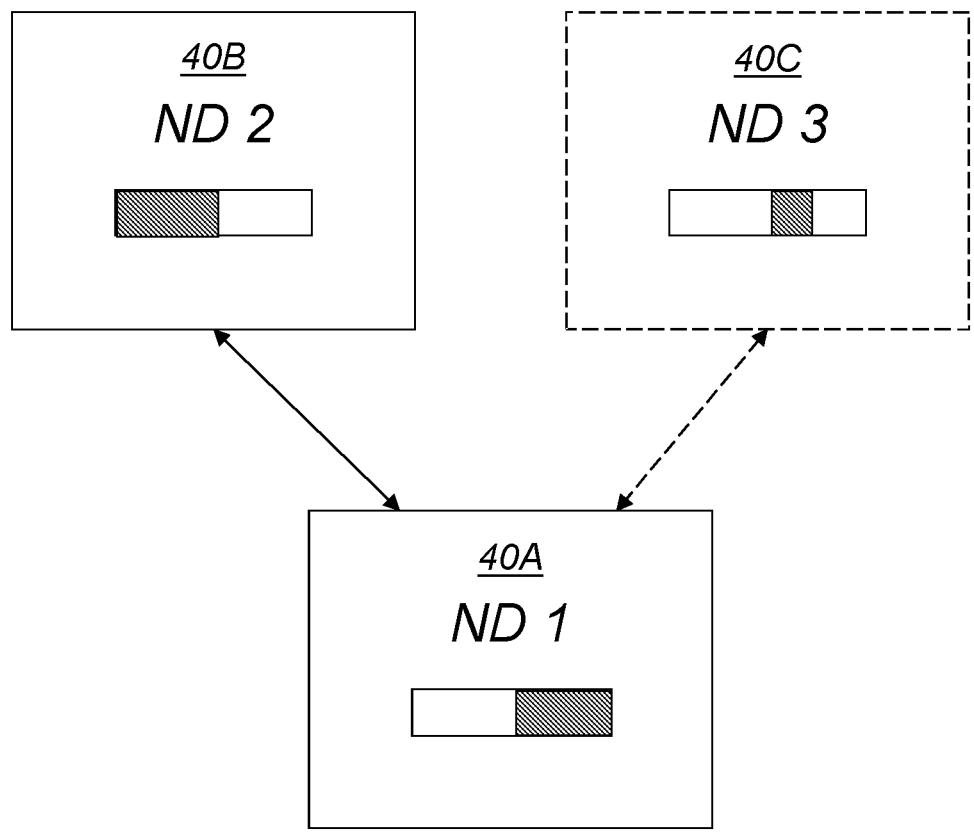
FIG. 30 is a schematic diagram illustrating a general example of functionality distribution or partition.
Figure 31:
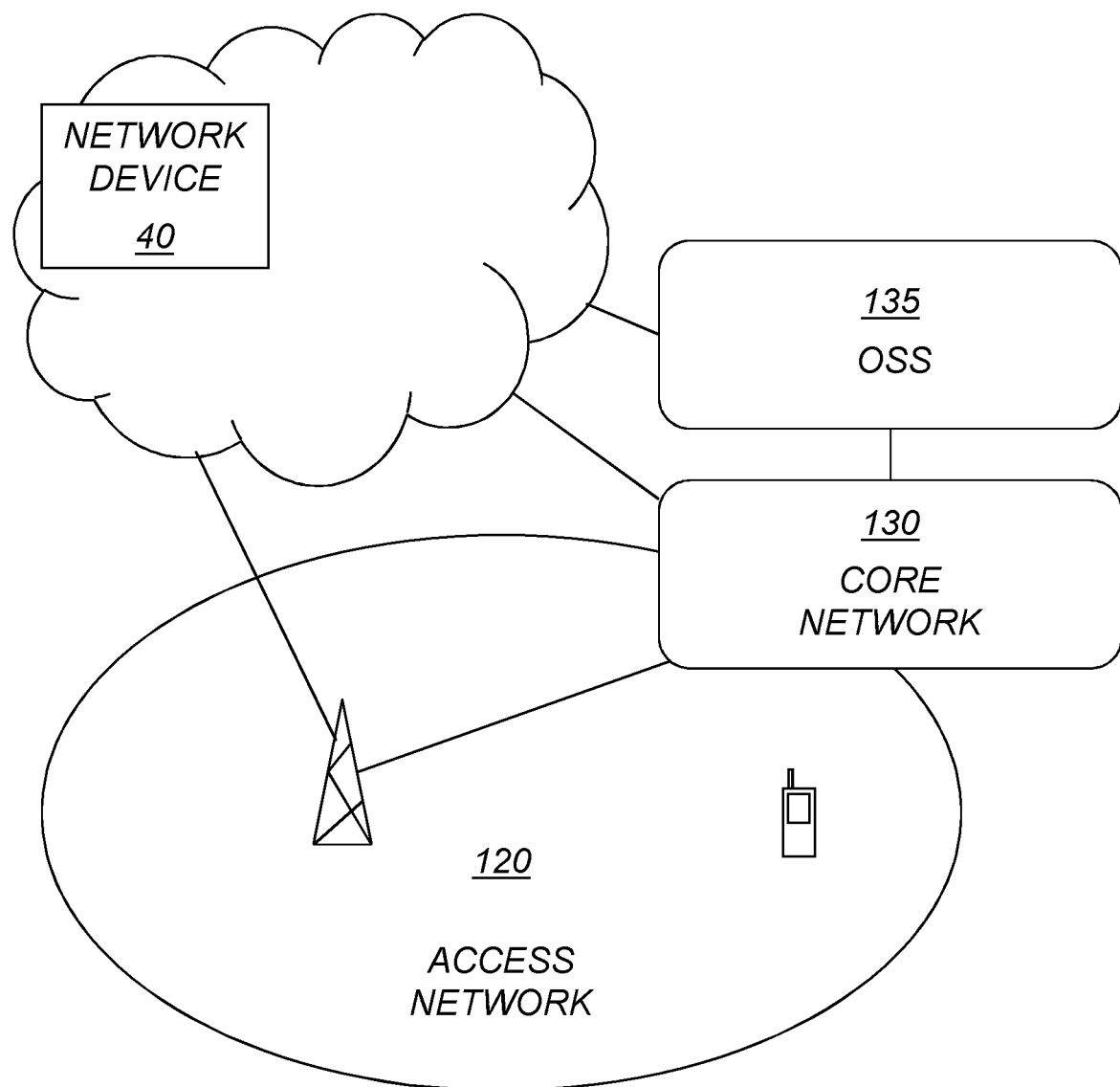
FIG. 31 is a schematic diagram illustrating an example of a wireless communication system in cooperation with one or more cloud-based network devices.

FIG. 29 is a schematic diagram illustrating an example of a node 30 connected to a cellular communication network. The node comprises a measure obtaining module 360, for obtaining measures of at least one of previous traffic load, previous radio quality of transmissions, and previous beam assignments of a first TRP. The node further comprises a calculator 370, for calculating a set of bias values representing connection quality predictions for a set of beams for transmission to a user equipment, using the obtained measures. The set of beams are used by the first TRP. The node further comprises a transmission initiator 380, for initiating transmission of the set of bias values to a radio base station managing the set of beams.

Alternatively it is possible to realize the module(s) in FIGS. 28 and 29 predominantly by hardware modules, or alternatively by hardware, with suitable interconnections between relevant modules. Particular examples include one or more suitably configured digital signal processors and other known electronic circuits, e.g. discrete logic gates interconnected to perform a specialized function, and/or Application Specific Integrated Circuits (ASICs) as previously mentioned. Other examples of usable hardware include input/output (I/O) circuitry and/or circuitry for receiving and/or sending signals. The extent of software versus hardware is purely implementation selection.

It is becoming increasingly popular to provide computing services (hardware and/or software) in network devices such as network nodes and/or servers where the resources are delivered as a service to remote locations over a network. By way of example, this means that functionality, as described herein, can be distributed or re-located to one or more separate physical nodes or servers. The functionality may be re-located or distributed to one or more jointly acting physical and/or virtual machines that can be positioned in separate physical node(s), i.e. in the so-called cloud. This is sometimes also referred to as cloud computing, which is a model for enabling ubiquitous on-demand network access to a pool of configurable computing resources such as networks, servers, storage, applications and general or customized services.

There are different forms of virtualization that can be useful in this context, including one or more of:

Consolidation of network functionality into virtualized software running on customized or generic hardware. This is sometimes referred to as network function virtualization.

Co-location of one or more application stacks, including operating system, running on separate hardware onto a single hardware platform. This is sometimes referred to as system virtualization, or platform virtualization.

Co-location of hardware and/or software resources with the objective of using some advanced domain level scheduling and coordination technique to gain increased system resource utilization. This is sometimes referred to as resource virtualization, or centralized and coordinated resource pooling.

Although it may often desirable to centralize functionality in so-called generic data centers, in other scenarios it may in fact be beneficial to distribute functionality over different parts of the network.

FIG. 28 is a schematic diagram illustrating an example of how functionality can be distributed or partitioned between different Network Devices (ND) in a general case. In this example, there are at least two individual, but interconnected network devices, ND 1 and ND 2, with reference numerals 40A and 40B, respectively, which may have different functionalities, or parts of the same functionality, partitioned between the network devices 40A and 40B. There may be additional network devices, such as ND 3, with reference numeral 40C, being part of such a distributed implementation. The network devices 40A-C may be part of the same wireless communication system, or one or more of the network devices may be so-called cloud-based network devices located outside of the wireless communication system.

FIG. 29 is a schematic diagram illustrating an example of a wireless communication system, including an access network 120 and/or a core network 130 and/or an Operations and Support System (OSS), 135 in cooperation with one or more cloud-based network devices 40. Functionality relevant for the access network 120 and/or the core network 130 and/or the OSS system 135 may be at least partially implemented for execution in a cloud-based network device 40, with suitable transfer of information between the cloud-based network device and the relevant network nodes and/or communication units in the access network and/or the core network and/or the OSS system.

A Network Device (ND) may generally be seen as an electronic device being communicatively connected to other electronic devices in the network.

By way of example, the network device may be implemented in hardware, software or a combination thereof. For example, the network device may be a special-purpose network device or a general purpose network device, or a hybrid thereof.

A special-purpose network device may use custom processing circuits and a proprietary operating system (OS), for execution of software to provide one or more of the features or functions disclosed herein.

A general purpose network device may use Common Off-The-Shelf (COTS) processors and a standard OS, for execution of software configured to provide one or more of the features or functions disclosed herein.

By way of example, a special-purpose network device may include hardware comprising processing or computing resource(s), which typically include a set of one or more processors, and physical network interfaces (NIs), which sometimes are called physical ports, as well as non-transitory machine readable storage media having stored thereon software. A physical NI may be seen as hardware in a network device through which a network connection is made, e.g. wirelessly through a Wireless Network Interface Controller (WNIC) or through plugging in a cable to a physical port connected to a Network Interface Controller (NIC). During operation, the software may be executed by the hardware to instantiate a set of one or more software instance(s). Each of the software instance(s), and that part of the hardware that executes that software instance, may form a separate virtual network element.

By way of another example, a general purpose network device may for example include hardware comprising a set of one or more processor(s), often COTS processors, and network interface controller(s) (NICs), as well as non-transitory machine readable storage media having stored thereon software. During operation, the processor(s) executes the software to instantiate one or more sets of one or more applications. While one embodiment does not implement virtualization, alternative embodiments may use different forms of virtualization—for example represented by a virtualization layer and software containers. For example, one such alternative embodiment implements operating system-level virtualization, in which case the virtualization layer represents the kernel of an operating system (or a shim executing on a base operating system) that allows for the creation of multiple software containers that may each be used to execute one of a sets of applications. In an example embodiment, each of the software containers (also called virtualization engines, virtual private servers, or jails) is a user space instance (typically a virtual memory space). These user space instances may be separate from each other and separate from the kernel space in which the operating system is executed; the set of applications running in a given user space, unless explicitly allowed, cannot access the memory of the other processes. Another such alternative embodiment implements full virtualization, in which case: 1) the virtualization layer represents a hypervisor (sometimes referred to as a Virtual Machine Monitor (VMM)) or the hypervisor is executed on top of a host operating system; and 2) the software containers each represent a tightly isolated form of software container called a virtual machine that is executed by the hypervisor and may include a guest operating system.

A hypervisor is the software/hardware that is responsible for creating and managing the various virtualized instances and in some cases the actual physical hardware. The hypervisor manages the underlying resources and presents them as virtualized instances. What the hypervisor virtualizes to appear as a single processor may actually comprise multiple separate processors. From the perspective of the operating system, the virtualized instances appear to be actual hardware components.

A virtual machine is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes.

The instantiation of the one or more sets of one or more applications as well as the virtualization layer and software containers if implemented, are collectively referred to as software instance(s). Each set of applications, corresponding software container if implemented, and that part of the hardware that executes them (be it hardware dedicated to that execution and/or time slices of hardware temporally shared by software containers), forms a separate virtual network element(s).

The virtual network element(s) may perform similar functionality compared to Virtual Network Element(s) (VNEs). This virtualization of the hardware is sometimes referred to as Network Function Virtualization (NFV). Thus, NFV may be used to consolidate many network equipment types onto industry standard high volume server hardware, physical switches, and physical storage, which could be located in data centers, NDs, and Customer Premise Equipment (CPE). However, different embodiments may implement one or more of the software container(s) differently. For example, while embodiments are illustrated with each software container corresponding to a VNE, alternative embodiments may implement this correspondence or mapping between software container-VNE at a finer granularity level; it should be understood that the techniques described herein with reference to a correspondence of software containers to VNEs also apply to embodiments where such a finer level of granularity is used.

According to yet another embodiment, there is provided a hybrid network device, which includes both custom processing circuitry/proprietary OS and COTS processors/standard OS in a network device, e.g. in a card or circuit board within a ND. In certain embodiments of such a hybrid network device, a platform Virtual Machine (VM), such as a VM that implements functionality of a special-purpose network device, could provide for para-virtualization to the hardware present in the hybrid network device.

Figure 32:
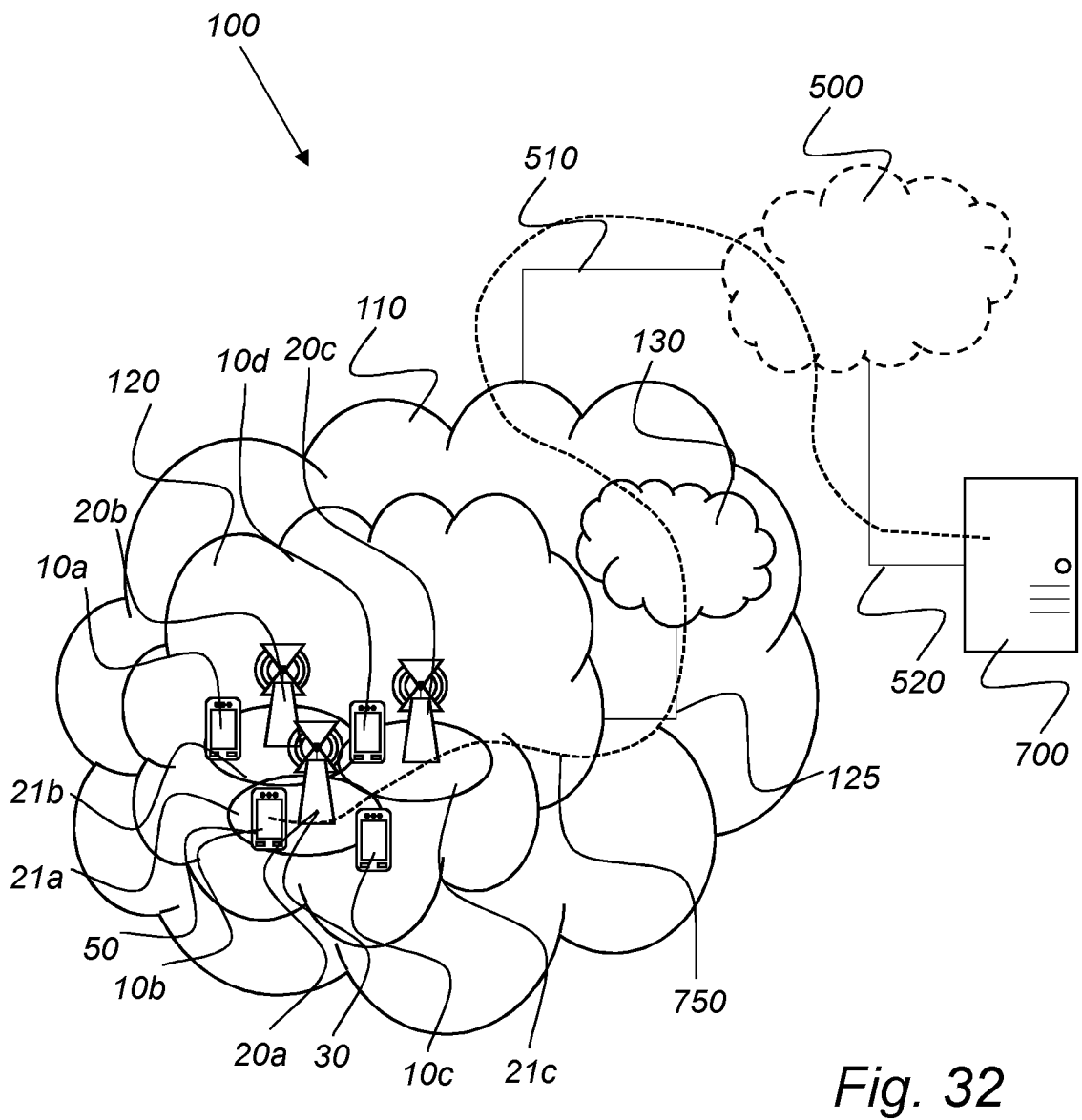
FIG. 32 schematically illustrates a telecommunication network connected via an intermediate network to a host computer.

With reference to FIG. 32, in accordance with an embodiment, a communication system 100 includes a telecommunication network 110, such as a 3GPP-type cellular network, which comprises an access network 120, such as a Radio Access Network (RAN), and a Core Network (CN) 130. The access network 120 comprises a plurality of base stations 20a, 20b, 20c, such as Node Bs (NB), evolved Node Bs (eNB), New Radio Node Bs (gNB) or other types of wireless access points, each defining a corresponding coverage area 21a, 21b, 21c. Each base station 20a, 20b, 20c is connectable to the CN 130 over a wired or wireless connection 125. A first user equipment (UE) 10a located in coverage area 21c is configured to wirelessly connect to, or be paged by, the corresponding base station 20c. A second UE 10b in coverage area 21a is wirelessly connectable to the corresponding base station 20a. While a plurality of UEs 10a-d are illustrated in this example, the disclosed embodiments are equally applicable to a situation where a sole UE is in the coverage area or where a sole UE is connecting to the corresponding base station 20.

The base station 20 is one type of a network node 30. Many operations that in a typical applications are performed in a base station 20 may alternatively be performed in another network node 30 or even in a node external to the telecommunication network 110. The devices and methods described here below as being performed in a base station 20 should be interpreted as also being possible to perform in a general network node 30.

The UE 10 is one type of a wireless device 11. Many operations that in a typical applications are performed in a UE 10 may alternatively be performed in any other wireless device 11. The devices and methods described here below as being performed in a UE 10 should be interpreted as also being possible to perform in a general wireless device 11.

The telecommunication network 110 is itself connected to a host computer 700, which may be embodied in the hardware and/or software of a standalone server, a cloud implemented server, a distributed server or as processing resources in a server farm. The host computer 700 may be under the ownership or control of a service provider, or may be operated by the service provider or on behalf of the service provider. The connections 510, 520 between the telecommunication network 110 and the host computer 700 may extend directly from the CN 130 to the host computer 700 or may go via an optional intermediate network 500. The intermediate network 500 may be one of, or a combination of more than one of, a public, private or hosted network; the intermediate network 500, if any, may be a backbone network or the Internet; in particular, the intermediate network 500 may comprise two or more sub-networks (not shown).

The communication system of FIG. 32 as a whole enables connectivity between one of the connected UEs 10a-d and the host computer 700. The connectivity may be described as an over-the-top (OTT) connection 750. The host computer 700 and the connected UEs 10a-d are configured to communicate data and/or signalling via the OTT connection 750, using the access network 120, the CN 130, any intermediate network 500 and possible further infrastructure (not shown) as intermediaries. The OTT connection 750 may be transparent in the sense that the participating communication devices through which the OTT connection 750 passes are unaware of routing of uplink and downlink communications. For example, a base station 20 may not or need not be informed about the past routing of an incoming downlink communication with data originating from a host computer 700 to be forwarded (e.g., handed over) to a connected UE 10. Similarly, the base station 20 need not be aware of the future routing of an outgoing uplink communication originating from the UE 10 towards the host computer 700.

Example implementations, in accordance with an embodiment, of the UE, base station and host computer discussed in the preceding paragraphs will now be described with reference to FIG. 33. In a communication system 100, a host computer 700 comprises hardware 710 including a communication interface 730 configured to set up and maintain a wired or wireless connection with an interface of a different communication device of the communication system 100. The host computer 700 further comprises processing circuitry 740, which may have storage and/or processing capabilities. In particular, the processing circuitry 740 may comprise one or more programmable processors, application-specific integrated circuits, field programmable gate arrays or combinations of these (not shown) adapted to execute instructions. The host computer 700 further comprises software 720, which is stored in or accessible by the host computer 700 and executable by the processing circuitry 740. The software 720 includes a host application 722. The host application 722 may be operable to provide a service to a remote user, such as a UE 10 connecting via an OTT connection 750 terminating at the UE 10 and the host computer 700. In providing the service to the remote user, the host application 722 may provide user data which is transmitted using the OTT connection 750.

The communication system 100 further includes a base station 20 provided in a telecommunication system and comprising hardware 155 enabling it to communicate with the host computer 700 and with the UE 10. The hardware 155 may include a communication interface 150 for setting up and maintaining a wired or wireless connection with an interface of a different communication device of the communication system 100, as well as a radio interface 160 for setting up and maintaining at least a wireless connection 165 with a UE 10 located in a coverage area (not shown in FIG. 33) served by the base station 20. The communication interface 150 may be configured to facilitate a connection 151 to the host computer 700. The connection 151 may be direct or it may pass through a CN (not shown in FIG. 33) of the telecommunication system and/or through one or more intermediate networks outside the telecommunication system. In the embodiment shown, the hardware 155 of the base station 20 further includes processing circuitry 170, which may comprise one or more programmable processors, application-specific integrated circuits, field programmable gate arrays or combinations of these (not shown) adapted to execute instructions. The base station 20 further has software 156 stored internally or accessible via an external connection.

The communication system 100 further includes the UE 10 already referred to. Its hardware 185 may include a radio interface 180 configured to set up and maintain a wireless connection 165 with a base station serving a coverage area in which the UE 10 is currently located. The hardware 185 of the UE 10 further includes processing circuitry 190, which may comprise one or more programmable processors, application-specific integrated circuits, field programmable gate arrays or combinations of these (not shown) adapted to execute instructions. The UE 10 further comprises software 186, which is stored in or accessible by the UE 10 and executable by the processing circuitry 190. The software 186 includes a client application 192. The client application 192 may be operable to provide a service to a human or non-human user via the UE 10, with the support of the host computer 700. In the host computer 700, an executing host application 722 may communicate with the executing client application 192 via the OTT connection 750 terminating at the UE 10 and the host computer 700. In providing the service to the user, the client application 192 may receive request data from the host application 722 and provide user data in response to the request data. The OTT connection 750 may transfer both the request data and the user data. The client application 192 may interact with the user to generate the user data that it provides.

Figure 33:
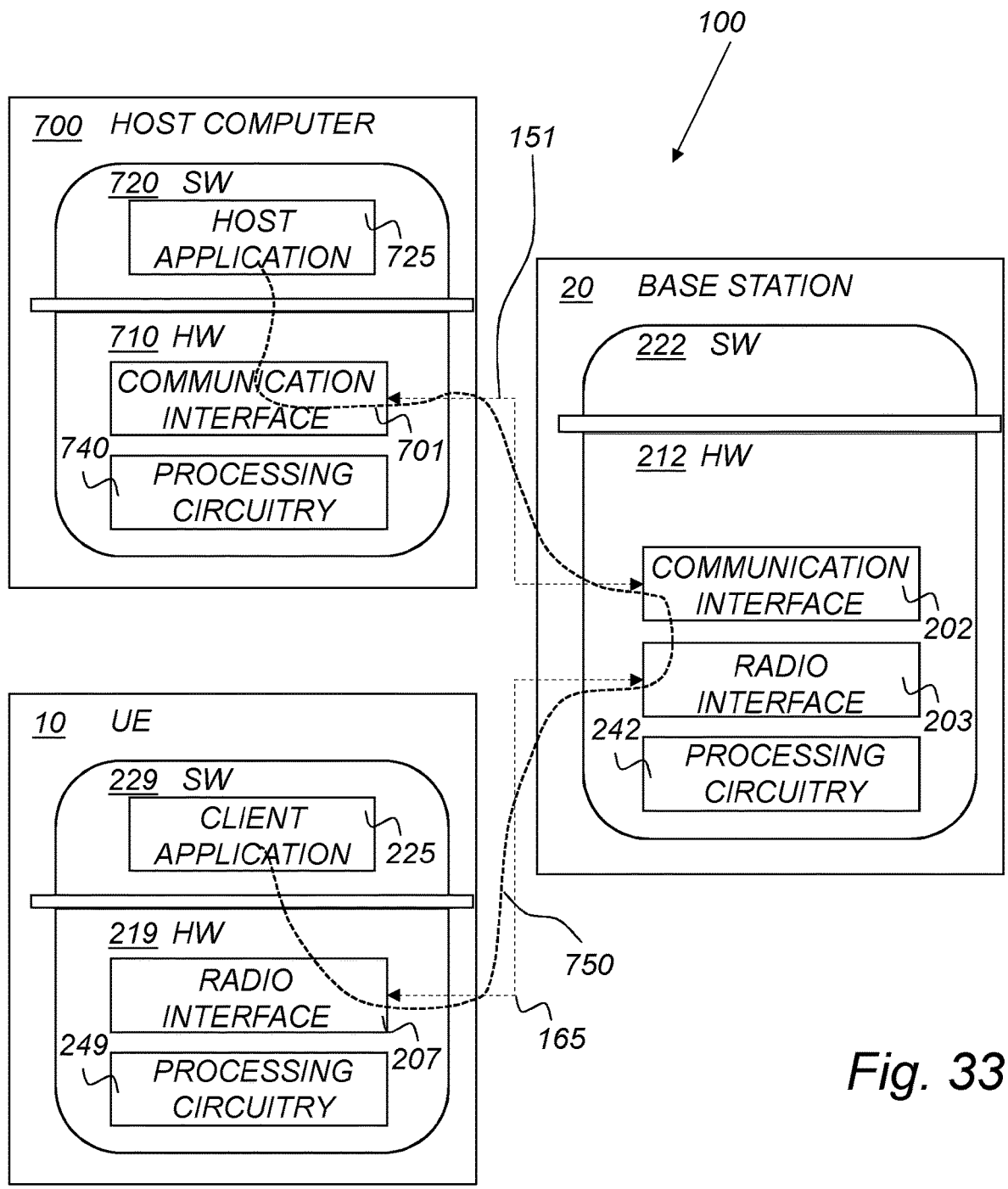
FIG. 33 is a generalized block diagram of a host computer communicating via a base station with a user equipment over a partially wireless connection.

It is noted that the host computer 700, base station 20 and UE 10 illustrated in FIG. 33 may be identical to the host computer 700, one of the base stations 20a, 20b, 20c and one of the UEs 10a-d of FIG. 32, respectively. This is to say, the inner workings of these entities may be as shown in FIG. 33 and independently, the surrounding network topology may be that of FIG. 32.

In FIG. 33, the OTT connection 750 has been drawn abstractly to illustrate the communication between the host computer 700 and the use equipment via the base station 20, without explicit reference to any intermediary devices and the precise routing of messages via these devices. Network infrastructure may determine the routing, which it may be configured to hide from the UE 10 or from the service provider operating the host computer 700, or both. While the OTT connection 750 is active, the network infrastructure may further take decisions by which it dynamically changes the routing (e.g., on the basis of load balancing consideration or reconfiguration of the network).

The wireless connection 165 between the UE 10 and the base station 20 is in accordance with the teachings of the embodiments described throughout this disclosure. One or more of the various embodiments improve the performance of OTT services provided to the UE 10 using the OTT connection 700, in which the wireless connection 165 forms the last segment. More precisely, the teachings of these embodiments may improve the all over data rate, latency and power consumption and thereby provide benefits such as reduced user waiting time, relaxed restriction on file size, better responsiveness, extended battery lifetime etc.

A measurement procedure may be provided for the purpose of monitoring data rate, latency and other factors on which the one or more embodiments improve. There may further be an optional network functionality for reconfiguring the OTT connection 750 between the host computer 700 and UE 10, in response to variations in the measurement results. The measurement procedure and/or the network functionality for reconfiguring the OTT connection 750 may be implemented in the software 720 of the host computer 700 or in the software 186 of the UE 10, or both. In embodiments, sensors (not shown) may be deployed in or in association with communication devices through which the OTT connection 750 passes; the sensors may participate in the measurement procedure by supplying values of the monitored quantities exemplified above, or supplying values of other physical quantities from which software 720, 186 may compute or estimate the monitored quantities. The reconfiguring of the OTT connection 750 may include message format, retransmission settings, preferred routing etc.; the reconfiguring need not affect the base station 20, and it may be unknown or imperceptible to the base station 20. Such procedures and functionalities may be known and practiced in the art. In certain embodiments, measurements may involve proprietary UE signalling facilitating the host computer's 700 measurements of throughput, propagation times, latency and the like. The measurements may be implemented in that the software 720 causes messages to be transmitted, in particular empty or 'dummy' messages, using the OTT connection 750 while it monitors propagation times, errors etc.

Figure 34:
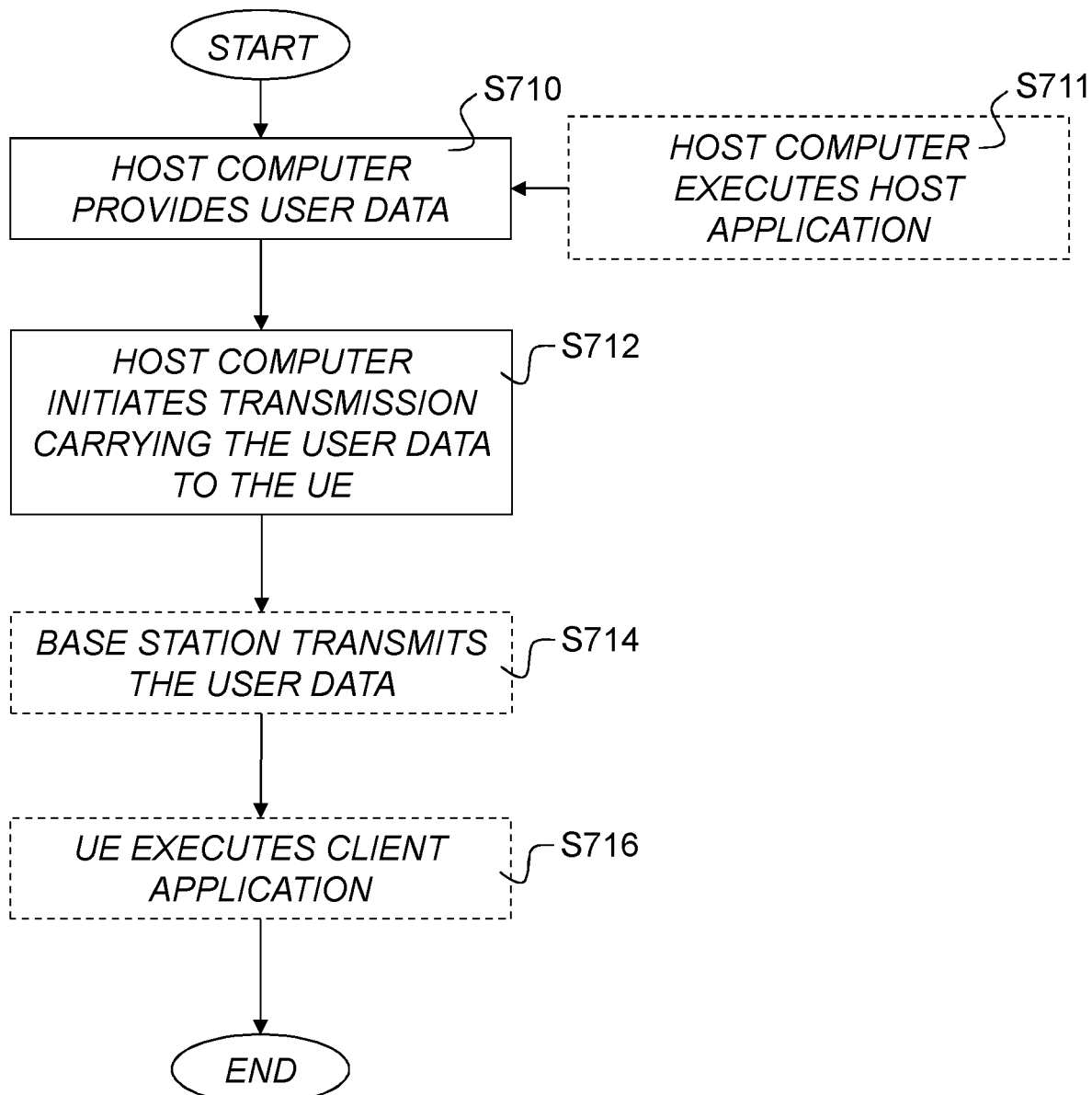
FIGS. 34-37 are flowcharts illustrating methods implemented in a communication system including a host computer, a base station and a user equipment.

FIG. 34 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 34 will be included in this section. In a first step S710 of the method, the host computer provides user data. In an optional sub-step S711 of the first step S710, the host computer provides the user data by executing a host application. In a second step S712, the host computer initiates a transmission carrying the user data to the UE. In an optional third step S714, the base station transmits to the UE the user data which was carried in the transmission that the host computer initiated, in accordance with the teachings of the embodiments described throughout this disclosure. In an optional fourth step S716, the UE executes a client application associated with the host application executed by the host computer.

Figure 35:
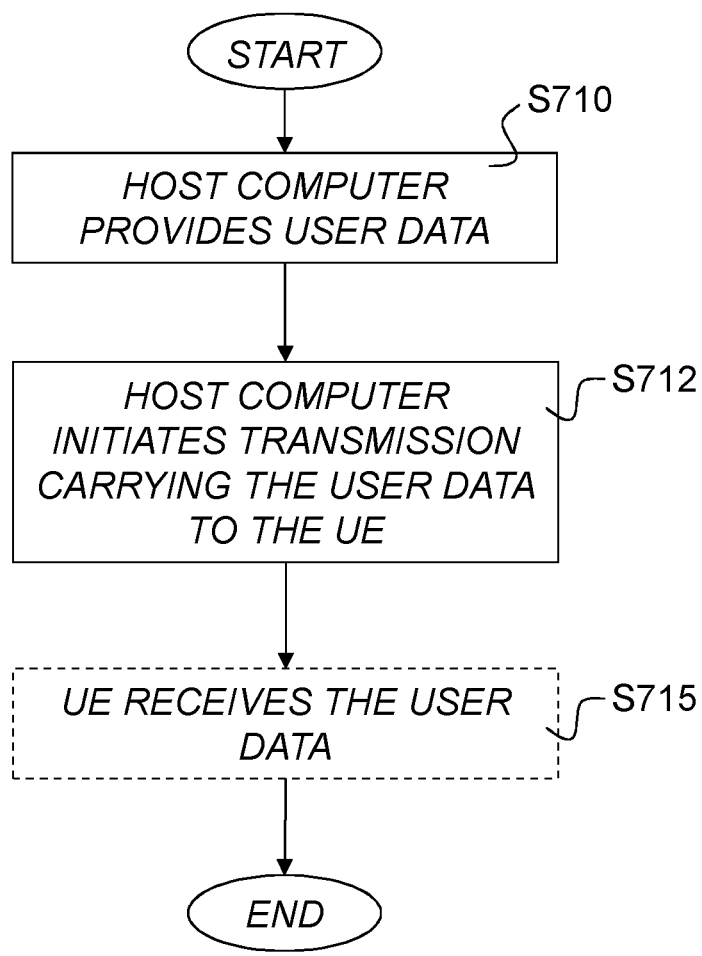

FIG. 35 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 35 will be included in this section. In a first step S710 of the method, the host computer provides user data. In an optional sub-step (not shown) the host computer provides the user data by executing a host application. In a second step S712, the host computer initiates a transmission carrying the user data to the UE. The transmission may pass via the base station, in accordance with the teachings of the embodiments described throughout this disclosure.

In an optional third step S715, the UE receives the user data carried in the transmission.

Figure 36:
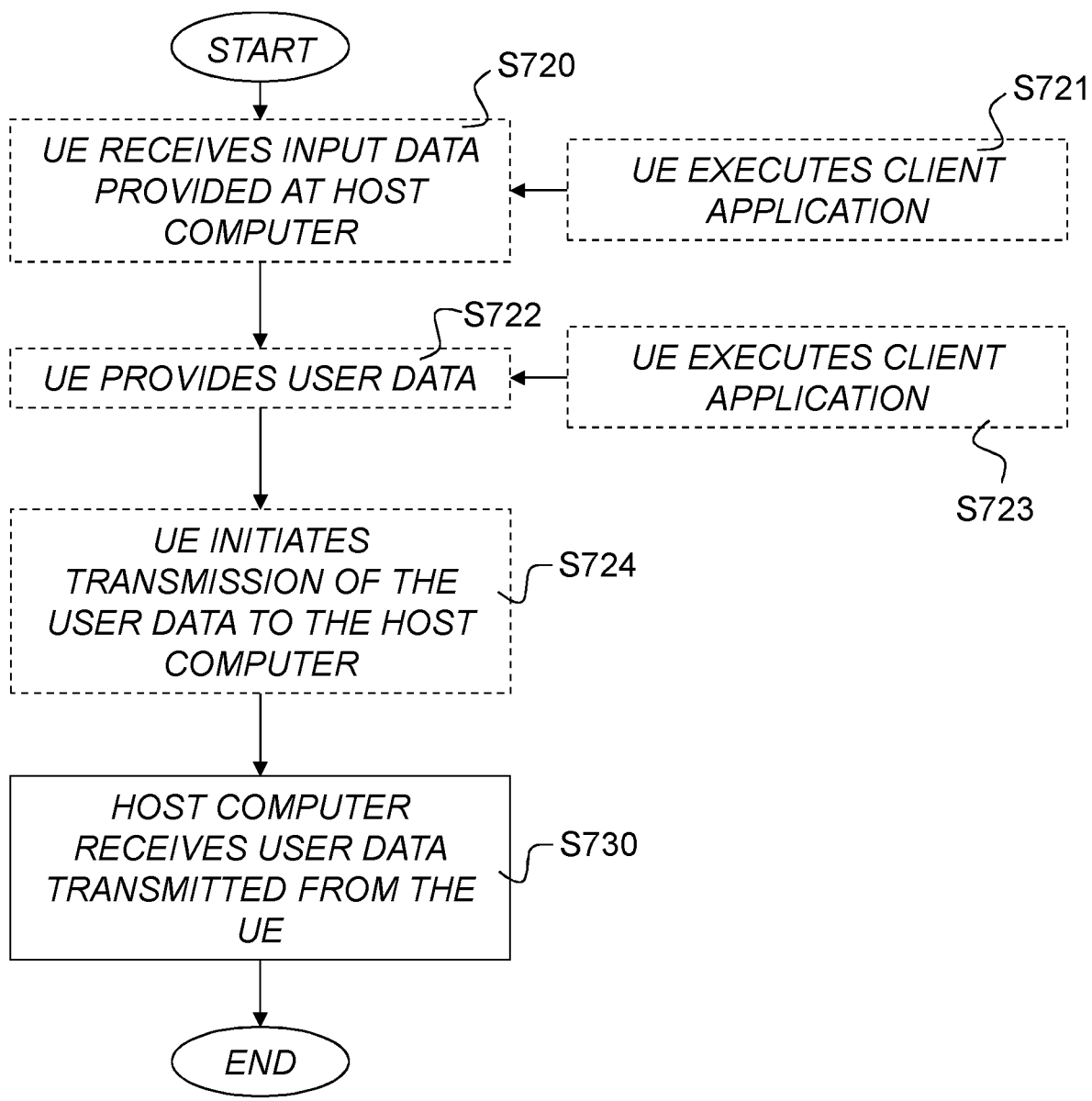

FIG. 36 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 36 will be included in this section. In an optional first step S720 of the method, the UE receives input data provided by the host computer. Additionally or alternatively, in an optional second step S722, the UE provides user data. In an optional sub-step S723 of the second step S722, the UE provides the user data by executing a client application. In a further optional sub-step S721 of the first step S720, the UE executes a client application which provides the user data in reaction to the received input data provided by the host computer. In providing the user data, the executed client application may further consider user input received from the user. Regardless of the specific manner in which the user data was provided, the UE initiates, in an optional third sub-step S724, transmission of the user data to the host computer. In a fourth step S730 of the method, the host computer receives the user data transmitted from the UE, in accordance with the teachings of the embodiments described throughout this disclosure.

Figure 37:
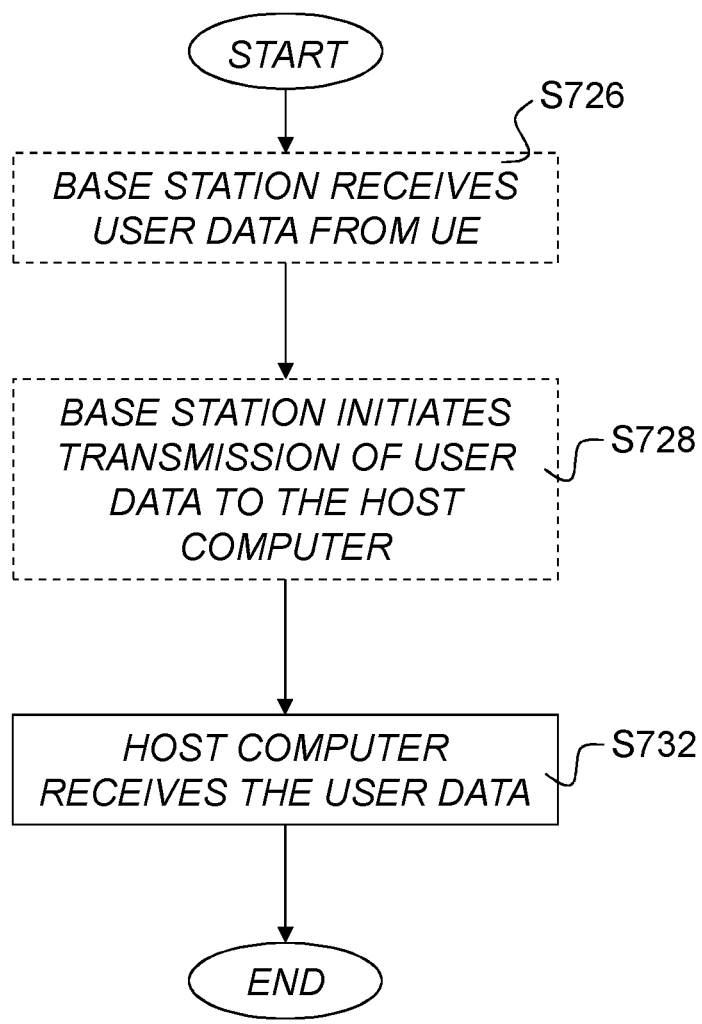

FIG. 37 is a flowchart illustrating a method implemented in a communication system, in accordance with one embodiment. The communication system includes a host computer, a base station and a UE which may be those described with reference to FIGS. 32 and 33. For simplicity of the present disclosure, only drawing references to FIG. 37 will be included in this section. In an optional first step S726 of the method, in accordance with the teachings of the embodiments described throughout this disclosure, the base station receives user data from the UE. In an optional second step S728, the base station initiates transmission of the received user data to the host computer. In a third step S732, the host computer receives the user data carried in the transmission initiated by the base station.

Numbered Embodiments

1. A network node configured to communicate with a wireless device, the network node comprising a radio interface and processing circuitry configured to obtain a set of channel gain estimations representing potential transmissions in a set of beams to a user equipment, to obtaining a set of bias values representing connection quality predictions for a respective beam of the set of beams for transmission to the user equipment, to determine a set of biased channel gain estimations by weighting the channel gain estimations in dependence of respective bias values, and to initiating, in the radio base station, a beam assignment based on the biased channel gain estimations.

2. The network node of embodiment 1, wherein the network node is a base station.

3. A communication system including a host computer comprising:
   processing circuitry configured to provide user data; and
   a communication interface configured to forward the user data to a cellular network for transmission to a wireless device,
   wherein the cellular network comprises a network node having a radio interface and processing circuitry, the processing circuitry of the network node being configured to obtain a set of channel gain estimations representing potential transmissions in a set of beams to a user equipment, to obtaining a set of bias values representing connection quality predictions for a respective beam of the set of beams for transmission to the user equipment, to determine a set of biased channel gain estimations by weighting the channel gain estimations in dependence of respective bias values, and to initiating, in the radio base station, a beam assignment based on the biased channel gain estimations.

4. The communication system of embodiment 3, further including the network node.

5. The communication system of embodiment 4, further including the wireless device, wherein the wireless device is configured to communicate with the network node.

6. The communication system of embodiment 5, wherein:
   the processing circuitry of the host computer is configured to execute a host application, thereby providing the user data; and
   the wireless device comprises processing circuitry configured to execute a client application associated with the host application.

7. The communication system of any of the embodiments 3 to 6, wherein the wireless device is a user equipment.

8. The communication system of any of the embodiments 3 to 7, wherein the network node is a base station.

9. A method implemented in a network node, comprising obtaining, in a radio base station, a set of channel gain estimations representing potential transmissions in a set of beams to a user equipment, wherein the set of beams are used by a first TRP, obtaining, in the radio base station, a set of bias values representing connection quality predictions for a respective beam of the set of beams for transmission to the user equipment, wherein the connection quality predictions are estimations calculated at least from measures of at least one of previous traffic load, previous radio quality of transmissions, and previous beam assignments of the first TRP, determining, in the radio base station, a set of biased channel gain estimations by weighting the channel gain estimations in dependence of respective bias values, and initiating, in the radio base station, a beam assignment based on the biased channel gain estimations.

10. A method implemented in a communication system including a host computer, a network node and a wireless device, the method comprising:
  at the host computer, providing user data; and
  at the host computer, initiating a transmission carrying the user data to the wireless device via a cellular network comprising the network node, wherein the network node obtains a set of channel gain estimations representing potential transmissions in a set of beams to a user equipment, wherein the set of beams are used by a first TRP, obtains a set of bias values representing connection quality predictions for a respective beam of the set of beams for transmission to the user equipment, wherein the connection quality predictions are estimations calculated at least from measures of at least one of previous traffic load, previous radio quality of transmissions, and previous beam assignments of the first TRP, determines a set of biased channel gain estimations by weighting the channel gain estimations in dependence of respective bias values, and initiates a beam assignment based on the biased channel gain estimations.

11. The method of embodiment 10, further comprising:
  at the network node, transmitting the user data.

12. The method of embodiment 11, wherein the user data is provided at the host computer by executing a host application, the method further comprising:
  at the wireless device, executing a client application associated with the host application.

13. The method of any of the embodiments 10 to 12, wherein the wireless device is a user equipment.

14. The method of any of the embodiments 9 to 13, wherein the network node is a base station.

15. A network node configured to communicate with a wireless device, the network node comprising a radio interface and processing circuitry configured to obtain a set of channel gain estimations representing potential transmissions in a set of beams to a user equipment, to obtaining a set of bias values representing connection quality predictions for a respective beam of the set of beams for transmission to the user equipment, to determine a set of biased channel gain estimations by weighting the channel gain estimations in dependence of respective bias values, and to initiating, in the radio base station, a beam assignment based on the biased channel gain estimations.

16. The network node of embodiment 15, wherein the network node is a base station.

17. The network node of embodiment 15 or 16, wherein the wireless device is a user equipment.

18. A communication system including a host computer comprising a communication interface configured to receive user data originating from a transmission from a wireless device to a network node, wherein the network node comprises a radio interface and processing circuitry, the processing circuitry of the network node being configured to obtain a set of channel gain estimations representing potential transmissions in a set of beams to a user equipment, to obtaining a set of bias values representing connection quality predictions for a respective beam of the set of beams for transmission to the user equipment, to determine a set of biased channel gain estimations by weighting the channel gain estimations in dependence of respective bias values, and to initiating, in the radio base station, a beam assignment based on the biased channel gain estimations.

19. The communication system of embodiment 18, further including the network node.

20. The communication system of embodiment 19, further including the wireless device, wherein the wireless device is configured to communicate with the network node.

21. The communication system of embodiment 20, wherein:
  the processing circuitry of the host computer is configured to execute a host application;
  the wireless device is configured to execute a client application associated with the host application, thereby providing the user data to be received by the host computer.

22. The communication system of any of the embodiments 18 to 21, wherein the network node is a base station.

23. The communication system of any of the embodiments 18 to 22, wherein the wireless device is a user equipment.

24. A method implemented in a network node, comprising obtaining, in a radio base station, a set of channel gain estimations representing potential transmissions in a set of beams to a user equipment, wherein the set of beams are used by a first TRP, obtaining, in the radio base station, a set of bias values representing connection quality predictions for a respective beam of the set of beams for transmission to the user equipment, wherein the connection quality predictions are estimations calculated at least from measures of at least one of previous traffic load, previous radio quality of transmissions, and previous beam assignments of the first TRP, determining, in the radio base station, a set of biased channel gain estimations by weighting the channel gain estimations in dependence of respective bias values, and initiating, in the radio base station, a beam assignment based on the biased channel gain estimations.

25. A method implemented in a communication system including a host computer, a network node and a wireless device, the method comprising:
  at the host computer, receiving, from the base station, user data originating from a transmission which the network node has received from the wireless device, wherein the wireless device obtains a set of channel gain estimations representing potential transmissions in a set of beams to a user equipment, wherein the set of beams are used by a first TRP, obtains a set of bias values representing connection quality predictions for a respective beam of the set of beams for transmission to the user equipment, wherein the connection quality predictions are estimations calculated at least from measures of at least one of previous traffic load, previous radio quality of transmissions, and previous beam assignments of the first TRP, determines a set of biased channel gain estimations by weighting the channel gain estimations in dependence of respective bias values, and initiates a beam assignment based on the biased channel gain estimations.

26. The method of embodiment 25, further comprising:
  at the network node, receiving the user data from the wireless device.

27. The method of embodiment 26, further comprising:
  at the network node, initiating a transmission of the received user data to the host computer.

28. The method of any of the embodiments 25 to 27, wherein the wireless device is a user equipment.

29. The method of any of the embodiments 24 to 28, wherein the network node is a base station.

The technology presented herein comprises a number of aspects. A set of bias values, organized in e.g. a matrix, per antenna system and UE, is used for adjusting choice of beam direction. In its simplest form, this is performed by adding or subtracting a certain amount of dB's from the measurement value the local beam forming utilizes for beam assignment decisions. There is a method for updating bias values based on predictions on future, also relatively short future, usage probability of beam index. The methods for utilizing beam selection bias can be applied for different kinds of purposes, such as e.g. avoiding interference towards own or other UEs or cells or avoiding usage of beams known to be bad for possibly unknown reasons, e.g. HW failure, local channel measurement discrepancies etc.

The embodiments described above are merely given as examples, and it should be understood that the proposed technology is not limited thereto. It will be understood by those skilled in the art that various modifications, combinations and changes may be made to the embodiments without departing from the present scope as defined by the appended claims. In particular, different part solutions in the different embodiments can be combined in other configurations, where technically possible.

ABBREVIATIONS

3GPP 3rd Generation Partnership Project
5G 5$^{th}$ Generation
ASIC Application Specific Integrated Circuits
BRSRP Beam Reference Symbol Reference Power
BTS Base Transceiver Stations
CD Compact Disc
CN Core Network
COTS Common Off-The-Shelf
CQI Channel quality index
CPE Customer Premises Equipment
CPU Central Processing Units
CRS Cell Reference Symbol
DSP Digital Signal Processors
DVD Digital Versatile Disc
eNB evolved Node B
FPGA Field Programmable Gate Arrays
gNB New Radio Node B
HDD Hard Disk Drive
HW hardware
I/O input/output
LEE Laptop Embedded Equipment
LME Laptop Mounted Equipment
MEM memory units
ML Machine Learning
NB Node B
ND Network Device
NFV Network Function Virtualization
NI Network Interfaces
NIC Network Interface Controller
NR New Radio
OS Operating System
OSS Operations and Support System
PC Personal Computer
PDA Personal Digital Assistant
PLC Programmable Logic Controllers
RAM Random Access Memory
RAN Radio Access Network
RBS Radio Base Station
RCF Radio Control Function
REG registers
ROM Read-Only Memory
RRU Remote Radio Units
STA Station
SW software
TRP Transmission reception point
UE User Equipment
USB Universal Serial Bus
VM Virtual Machine
VMM Virtual Machine Monitor
VNE Virtual Network Element
VoIP Voice over the Internet Protocol
WNIC Wireless Network Interface Controller

The invention claimed is:

1. A method for beam assignment support, said method comprising:
    obtaining, in a radio base station, a set of channel gain estimations representing potential transmissions in a set of beams to a user equipment, wherein said set of beams are used by a first transmission reception point;
    obtaining, in said radio base station, a set of bias values representing connection quality predictions for a respective beam of said set of beams for transmission to said user equipment, in which the set of bias values comprises corrections for expected beam channel impairments not reflected in the set of channel gain estimations, including beam channel impairments related to a presence of other user equipment, wherein said connection quality predictions are estimations calculated at least from measures of at least one of previous traffic load, previous radio quality of transmissions, and previous beam assignments of said first transmission reception point;
    determining, in said radio base station, a set of biased channel gain estimations by weighting said channel gain estimations in dependence of respective bias values; and
    initiating, in said radio base station, a beam assignment based on said biased channel gain estimations for said set of beams.

2. The method according to claim 1, wherein said connection quality predictions are connection quality predictions at least at a time for a next beam assignment.

3. The method according to claim 1, wherein said connection quality predictions are estimations calculated also from measures of at least one of previous traffic load, previous radio quality of transmissions, and previous beam assignments of a second transmission reception point being in a radio interference relation to said first transmission reception point.

4. The method according to claim 1, wherein said connection quality predictions are estimations utilizing statistical information about used beams and the transmission experience thereof, giving a long term view of an environment, wherein long term is defined as more than one transmission time entity.

5. A method for beam assignment support, said method comprising:
    obtaining, in a node, measures of at least one of previous traffic load, previous radio quality of transmissions, and previous beam assignments of a first transmission reception point;
    calculating, in said node, a set of bias values representing connection quality predictions for a set of beams for transmission to a user equipment, using said obtained measures, in which the set of bias values comprises corrections for expected beam channel impairments not reflected in a set of channel gain estimations for the user equipment, including beam channel impairments related to a presence of other user equipment, wherein said set of beams are used by said first transmission reception point; and initiating, in said node, transmission of said set of bias values to a radio base station for determining biased channel gain estimations by weighting said set of channel gain estimations in dependence of respective bias values to manage said set of beams.

6. The method according to claim 5, wherein said connection quality predictions are connection quality predictions at least at a time for a next beam assignment.

7. The method according to claim 5, wherein the obtaining measures in said node further comprises obtaining measures of at least one of previous traffic load, previous radio quality of transmissions, and previous beam assignments of a second transmission reception point being in a radio interference relation to said first transmission reception point, wherein the calculating, in said node, said set of bias values is further performed using said measures of at least one of previous traffic load, previous radio quality of transmissions, and previous beam assignments of said first transmission reception point, said second transmission reception point, or both said first transmission reception point and said second transmission reception point.

8. The method according to claim 5, wherein the calculating said set of bias values utilizes statistical information about used beams and the transmission experience thereof, giving a long term view of an environment, wherein long term is defined as more than one transmission time entity.

9. A radio base station in a cellular communication system, wherein said radio base station is to obtain a set of biased channel gain estimations representing potential transmissions in a set of beams to a user equipment, wherein said set of beams are used by a first transmission reception point, the radio base station comprising:

a processor; and a memory containing instructions which, when executed by the processor, cause the radio base station to perform operations to:

obtain a set of bias values representing connection quality predictions for a respective beam of said set of beams for transmission to said user equipment, in which the set of bias values comprises corrections for expected beam channel impairments not reflected in a set of channel gain estimations for the user equipment, including beam channel impairments related to a presence of other user equipment, wherein said connection quality predictions are estimations calculated at least from measures of at least one of previous traffic load, previous radio quality of transmissions, and previous beam assignments of said first transmission reception point;

determine the set of biased channel gain estimations by weighting said channel gain estimations in dependence of respective bias values; and initiate a beam assignment based on said biased channel gain estimations.

10. The radio base station according to claim 9, wherein said connection quality predictions are connection quality predictions at least at a time for a next beam assignment.

11. The radio base station according to claim 9, wherein said connection quality predictions are estimations calculated also from measures of at least one of previous traffic load, previous radio quality of transmissions, and previous beam assignments of a second transmission reception point being in a radio interference relation to said first transmission reception point.

12. The radio base station according to claim 9, wherein obtaining of said set of channel gain estimations is for a plurality of user equipment and wherein said radio base station is further configured to estimate said connection quality predictions for different user equipment in dependence of each other.

13. The radio base station according to claim 9 wherein obtaining of said set of bias values comprising receiving data representing said set of bias values from a node configured to provide data representing sets of bias values to a plurality of radio base stations.

14. A node connected to a cellular communication network, wherein said node obtains measures of at least one of previous traffic load, previous radio quality of transmissions, and previous beam assignments of a first transmission reception point, the node comprising:

a processor; and a memory containing instructions which, when executed by the processor, cause the node to perform operations to:

calculate a set of bias values representing connection quality predictions for a set of beams for transmission to a user equipment, using said obtained measures, in which the set of bias values comprises corrections for expected beam channel impairments not reflected in a set of channel gain estimations for the user equipment, including beam channel impairments related to a presence of other user equipment, wherein said set of beams are used by said first transmission reception point; and initiate transmission of said set of bias values to a radio base station for determining biased channel gain estimations by weighting said set of channel gain estimations in dependence of respective bias values to manage said set of beams.

15. The node according to claim 14, wherein said connection quality predictions are connection quality predictions at least at a time for a next beam assignment.

16. The node according to claim 14, wherein obtaining of measures comprising obtaining measures of at least one of previous traffic load, previous radio quality of transmissions, and previous beam assignments of a second transmission reception point being in a radio interference relation to said first transmission reception point, and to calculate said set of bias values by further using said measures of at least one of previous traffic load, previous radio quality of transmissions, and previous beam assignments of said first transmission reception point, said second transmission reception point, or both said first transmission reception point and said second transmission reception point.

17. The node according to claim 14, wherein obtaining of measures is for a plurality of user equipment and wherein said node further to perform said calculation of a set of bias values for said plurality of user equipment in dependence of each other.

18. The node according to claim 14, wherein obtaining of measures, said calculating of said set of bias values, and said initiating of a transmission of said set of bias values are for a plurality of radio base stations.

* * * * *